(12) United States Patent
Nonaka et al.

(10) Patent No.: US 9,909,647 B2
(45) Date of Patent: Mar. 6, 2018

(54) V-BELT AND PRODUCTION METHOD THEREFOR

(71) Applicant: BANDO CHEMICAL INDUSTRIES, LTD., Kobe-shi (JP)

(72) Inventors: Keizo Nonaka, Kobe (JP); Yasuhiro Takano, Kobe (JP)

(73) Assignee: Bando Chemical Industries, Ltd., Kobe-shi (JP)

( * ) Notice: Subject to any disclaimer, the term of this patent is extended or adjusted under 35 U.S.C. 154(b) by 0 days.

(21) Appl. No.: 15/083,053

(22) Filed: Mar. 28, 2016

(65) Prior Publication Data

US 2016/0208890 A1 Jul. 21, 2016

Related U.S. Application Data

(63) Continuation of application No. PCT/JP2014/004123, filed on Aug. 7, 2014.

(30) Foreign Application Priority Data

Sep. 26, 2013 (JP) .................................. 2013-199472

(51) Int. Cl.
| | |
|---|---|
| *F16G 1/00* | (2006.01) |
| *F16G 5/00* | (2006.01) |
| *F16G 9/00* | (2006.01) |
| *F16G 5/06* | (2006.01) |
| *C08L 23/16* | (2006.01) |
| *F16G 5/20* | (2006.01) |

(Continued)

(52) U.S. Cl.
CPC ............. *F16G 5/06* (2013.01); *B29D 29/103* (2013.01); *C08J 3/203* (2013.01); *C08J 5/046* (2013.01); *C08J 5/10* (2013.01); *C08K 3/04* (2013.01); *C08L 23/16* (2013.01); *F16G 5/20* (2013.01); *B29K 2023/16* (2013.01); *B29K 2105/162* (2013.01); *B29K 2467/003* (2013.01); *B29K 2477/00* (2013.01); *C08J 2323/16* (2013.01); *C08J 2423/06* (2013.01); *C08J 2467/02* (2013.01); *C08J 2477/00* (2013.01); *C08J 2477/06* (2013.01)

(58) Field of Classification Search
CPC . F16G 5/20; C08L 23/16; C08L 23/34; C08K 7/02; C08K 3/04
USPC .......................................... 474/260, 263, 264
See application file for complete search history.

(56) References Cited

U.S. PATENT DOCUMENTS

| | | | | |
|---|---|---|---|---|
| 5,711,734 A | * | 1/1998 | Shioyama | ............ C08K 5/3415 474/260 |
| 7,901,313 B2 | * | 3/2011 | Shiriike | .................... F16G 5/20 474/260 |

(Continued)

FOREIGN PATENT DOCUMENTS

| | | |
|---|---|---|
| CN | 101126433 A | 2/2008 |
| CN | 102203455 A | 9/2011 |

(Continued)

*Primary Examiner* — Henry Y Liu

(74) *Attorney, Agent, or Firm* — Knobbe, Martens, Olson & Bear, LLP

(57) ABSTRACT

A V-belt (B) includes a rubber composition forming a portion (11) to be V-shaped side faces (110). Organic nanofibers (16) and organic short fibers (17) are included in the rubber composition, and oriented along a belt width. In the rubber composition, a ratio of a storage modulus in a grain direction to a storage modulus in cross-grain direction is 5 or greater.

14 Claims, 20 Drawing Sheets

(51) Int. Cl.
*B29D 29/10* (2006.01)
*C08J 5/04* (2006.01)
*C08J 5/10* (2006.01)
*C08K 3/04* (2006.01)
*C08J 3/20* (2006.01)
*B29K 23/00* (2006.01)
*B29K 105/16* (2006.01)
*B29K 467/00* (2006.01)
*B29K 477/00* (2006.01)

(56) References Cited

U.S. PATENT DOCUMENTS

| | | | | |
|---|---|---|---|---|
| 8,157,684 | B2* | 4/2012 | Ito | G03G 15/754 |
| | | | | 474/237 |
| 8,609,774 | B2* | 12/2013 | Terada | B65G 15/32 |
| | | | | 198/844.1 |
| 8,974,336 | B2* | 3/2015 | Nakashima | F16G 1/10 |
| | | | | 428/221 |
| 2005/0176540 | A1* | 8/2005 | Ito | G03G 15/754 |
| | | | | 474/237 |
| 2007/0249450 | A1* | 10/2007 | Shiriike | F16G 5/20 |
| | | | | 474/260 |
| 2009/0011884 | A1* | 1/2009 | Nakashima | F16G 5/20 |
| | | | | 474/205 |
| 2009/0186733 | A1* | 7/2009 | Fujiwara | C08J 3/243 |
| | | | | 474/264 |
| 2010/0203994 | A1* | 8/2010 | Fujikawa | C08K 3/04 |
| | | | | 474/263 |
| 2010/0240482 | A1* | 9/2010 | Kanzow | F16G 5/08 |
| | | | | 474/237 |
| 2011/0124453 | A1* | 5/2011 | Nakashima | F16G 1/10 |
| | | | | 474/139 |
| 2011/0218069 | A1 | 9/2011 | Nakashima et al. | |
| 2012/0067706 | A1* | 3/2012 | Terada | B65G 15/32 |
| | | | | 198/844.1 |
| 2012/0252619 | A1* | 10/2012 | Uchigashima | F16G 1/28 |
| | | | | 474/205 |
| 2012/0295748 | A1* | 11/2012 | Shiriike | F16G 5/20 |
| | | | | 474/148 |
| 2013/0085028 | A1* | 4/2013 | Yamada | F16G 5/08 |
| | | | | 474/263 |
| 2014/0066244 | A1* | 3/2014 | Furukawa | F16G 5/20 |
| | | | | 474/263 |
| 2014/0364260 | A1* | 12/2014 | Takahashi | C08J 5/04 |
| | | | | 474/263 |
| 2015/0148165 | A1* | 5/2015 | Matsuda | F16G 5/20 |
| | | | | 474/264 |
| 2015/0369335 | A1* | 12/2015 | Ishiguro | C08K 7/02 |
| | | | | 474/260 |

FOREIGN PATENT DOCUMENTS

| | | |
|---|---|---|
| EP | 0562642 A1 | 9/1993 |
| EP | 2952779 A1 | 12/2015 |
| EP | 3045770 A1 | 7/2016 |
| JP | H05-271480 A | 10/1993 |
| JP | 2006-266280 A | 10/2006 |
| JP | 2009-030728 A | 2/2009 |
| JP | 2011-064257 A | 3/2011 |
| JP | 2012-077223 A | 4/2012 |
| JP | 2012-207220 A | 10/2012 |

* cited by examiner

V-BELT AND PRODUCTION METHOD THEREFOR

CROSS-REFERENCE TO RELATED APPLICATIONS

This is a continuation of International Application No. PCT/JP2014/004123 filed on Aug. 7, 2014, which claims priority to Japanese Patent Application No. 2013-199472 filed on Sep. 26, 2013. The entire disclosures of these applications are incorporated by reference herein.

BACKGROUND

The present invention relates to a V-belt and a production method therefor.

Composite materials, made of elastomer with nanofibers dispersed therein, have been studied for their applications to car parts, and electric and electronic parts.

For example, Japanese Unexamined Patent Publication No. 2012-207220 discloses a fiber-reinforced elastomer part. The part is made of a matrix of ethylene-α-olefin elastomer with matrix-domain-type composite short fibers added to the matrix. The matrix component is then melted, and nanofibers, included in the domain component and each having a fiber diameter ranging from 10 nm to 5,000 nm, are dispersed into the matrix of the ethylene-α-olefin elastomer.

Japanese Unexamined Patent Publication No. 2012-77223 discloses a fiber-reinforced elastic body used for belts for cars and industrial purposes, such as toothed belts and flat belts. The fiber-reinforced elastic body is made of a matrix, including polyolefin, first elastomer, and silica, kneaded together with a fiber-reinforced thermoplastic resin composition and a second elastomer. The fiber-reinforced thermoplastic resin composition includes nanofibers dispersed thereinto, and each having a fiber diameter of 1 μm and smaller and an aspect ratio ranging from 2 to 1,000.

SUMMARY

A V-belt according to the present invention comprises a rubber composition forming a portion to be V-shaped side faces of the V-belt, wherein the rubber composition includes nanofibers and organic short fibers oriented along a belt width of the V-belt, the nanofibers being organic fibers having a fiber diameter ranging from 300 nm to 1,000 nm, and the organic short fibers having a fiber diameter of 10 μm or larger, and in the rubber composition, a ratio of a storage modulus in a grain direction along the belt width to a storage modulus in a cross-grain direction along a belt length of the V-belt is 5 or greater, the storage modulus in the grain direction being measured based on JIS K6394 with the rubber composition stretched at a mean strain which is a strain under a load 1.3 times greater than a load at a strain of 1%, a strain amplitude of 0.1%, a frequency of 10 Hz, and a test temperature of 100° C., and the storage modulus in the cross-grain direction being measured based on JIS K6394 with the rubber composition stretched at the mean strain of 5%, the strain amplitude of 1%, the frequency of 10 Hz, and the test temperature of 100° C.

A method for producing a V-belt comprises preparing a kneaded body, the preparing including kneading a rubber component with a composite material having a matrix-domain structure, including (i) a matrix having thermoplastic resin and (ii) domains formed of a bundle of organic nanofibers having a fiber diameter ranging from 300 nm to 1,000 nm, at a temperature higher than or equal to a melting point or a softening temperature of the thermoplastic resin in the composite material so that the kneaded body is prepared, the kneaded body being made of an uncrosslinked rubber composition including the rubber component in which the nanofibers and organic short fibers are dispersed, and the organic short fibers having a fiber diameter of 10 μm or greater; rolling the kneaded body, of the uncrosslinked rubber composition, prepared in the preparing to produce an uncrosslinked rubber composition sheet to be used for forming the portion to be the V-shaped side faces; and forming a belt product out of the uncrosslinked rubber composition sheet produced in the rolling such that a grain direction of the uncrosslinked rubber composition sheet is oriented along a width of the V-belt, and crosslinking the formed belt.

DESCRIPTION OF EMBODIMENTS

Embodiments will now be described in detail with reference to the drawings.

(First Embodiment)

Figure 1:
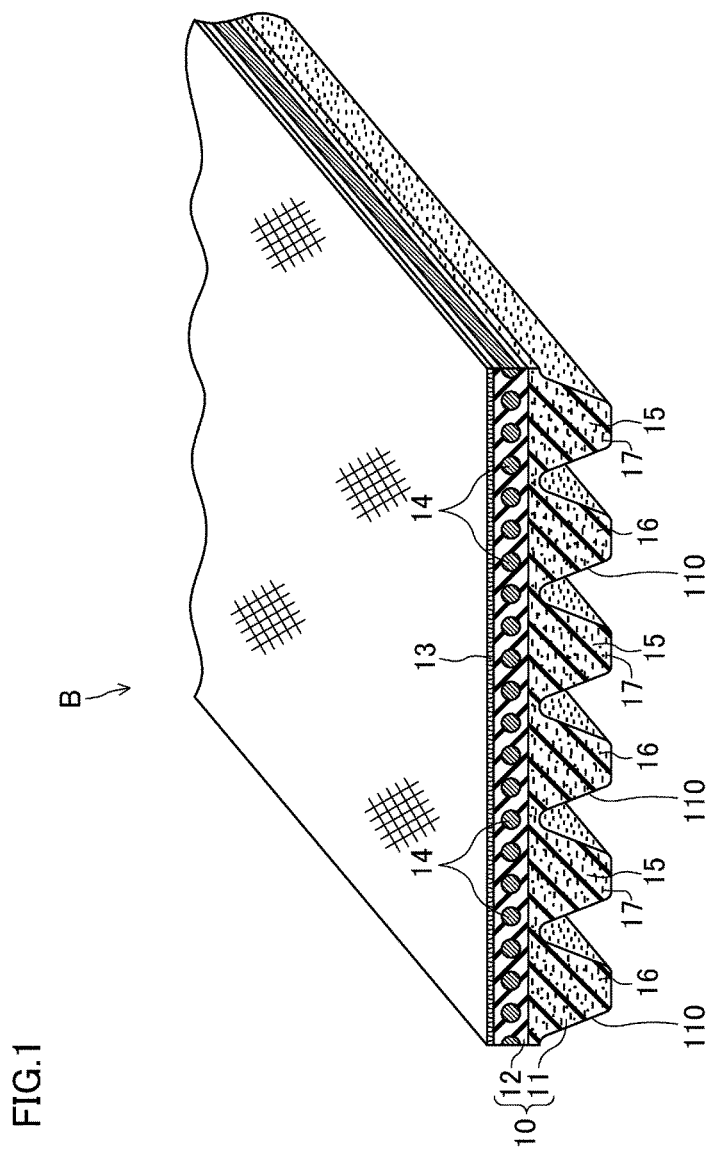
FIG. 1 is a perspective view illustrating a portion cut out from a V-ribbed belt according to a first embodiment.
Figure 2:
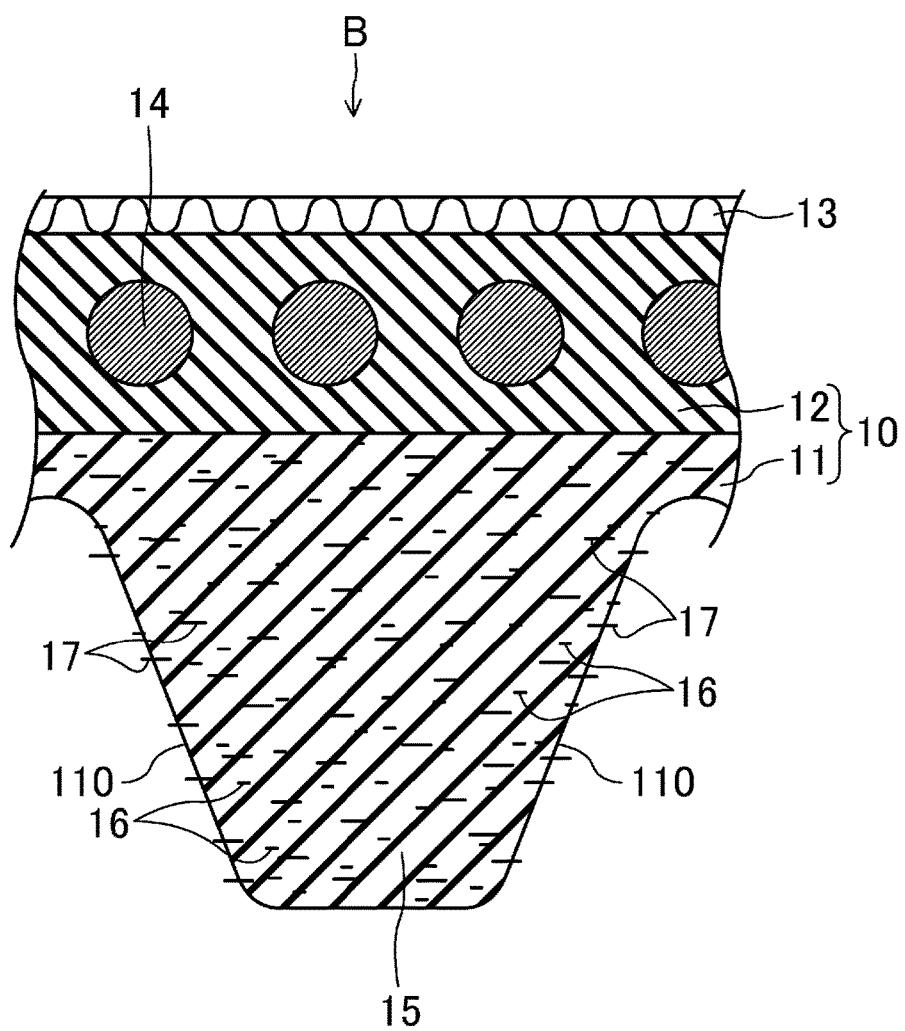
FIG. 2 is a cross-sectional view of a V-shaped rib of the V-ribbed belt according to the first embodiment.

FIGS. 1 and 2 illustrate a V-ribbed belt B (V-belt) according to the first embodiment. Also referred to as a poly-V belt, the V-ribbed belt B according to the first embodiment is used for an accessory drive belt transmission system provided in an automotive engine compartment, for example. The V-ribbed belt B according to the first embodiment has a belt length ranging from 700 mm to 3,000 mm, a belt width ranging from 10 mm to 36 mm, and a belt thickness ranging from 4.0 mm to 5.0 mm, for example.

This V-ribbed belt B according to the first embodiment has a V-ribbed belt body 10 including a compressed rubber layer 11 to the inner circumference of the belt and an adhesive rubber layer 12 to the outer circumference of the belt, such that both of the layers are stacked on top of each other to be integrated into one. A back surface reinforcing fabric 13, acting as a belt back surface, is bonded with the adhesive rubber layer 12 to the outer circumference of the belt, such that the layer and the fabric are stacked on top of each other. Furthermore, a cord 14 is embedded in the middle of the adhesive rubber layer 12 along the belt thickness. The cord 14 is helical with a pitch along the belt width.

The compressed rubber layer 11 has multiple V-shaped ribs 15 protruding toward the inner circumference of the belt. Each of the V-shaped ribs 15 has V-shaped side faces 110 acting as a pulley contact surface. The V-shaped ribs 15 are arranged in parallel to one another along the belt width. Each V-shaped rib 15 is shaped into a ridge extending along the belt length, and having an approximately inverted triangular cross-section The V-shaped rib 15 has a height ranging from 2.0 mm to 3.0 mm, for example. A width between the base ends of the V-shaped rib 15 ranges from 1.0 mm to 3.6 mm, for example. A V-angle of the rib 15 ranges from 35° to 40°, for example. There are three to six V-shaped ribs 15, for example (in FIG. 1, there are six ribs).

The compressed rubber layer 11 is formed of a rubber composition. The rubber composition is made of an uncrosslinked rubber composition including a rubber component mixed with organic nanofibers 16 (hereinafter simply referred to as "nanofibers 16"), organic short fibers 17, and various kinds of rubber compounding ingredients. The uncrosslinked rubber composition is then heated and pressurized, the rubber component is crosslinked by a crosslinker, and, as a result, the rubber composition is produced.

Examples of rubber components for the rubber composition forming the compressed rubber layer 11 are ethylene-α-olefin elastomer, chloroprene rubber (CR), chlorosulfonated polyethylene rubber (CSM), hydrogenated nitrile butadiene rubber (HNBR), natural rubber (NR), styrene-butadiene rubber (SBR), butadiene rubber (BR), and nitrile rubber (NBR). Among these rubber components, the ethylene-α-olefin elastomer is beneficial in view of excellent heat and cold resistance.

Examples of α-olefin components of the ethylene-α-olefin elastomer include propylene, pentene, and octene. Examples of diene components include unconjugated diene such as 1,4-hexadiene, dicyclopentadiene, and ethylidene-norbornene. Specifically, examples of the ethylene-α-olefin elastomer include EPDM and EPR.

The rubber component of the rubber composition forming the compressed rubber layer 11 may be a single kind of component alone. Alternatively, the rubber component may be made of a rubber blend including multiple kinds of rubber components. Note that if the rubber blend includes the ethylene-α-olefin elastomer as the main component, other kinds of rubber included in the rubber blend are beneficially of 25% by mass or smaller in order not to ruin the characteristics of the ethylene-α-olefin elastomer.

The nanofibers 16 are included in the rubber composition forming the compressed rubber layer 11, and oriented along the belt width.

Each of the nanofibers 16 has a fiber diameter ranging from 300 nm to 1,000 nm, beneficially larger than or equal to 400 nm, and further beneficially smaller than or equal to 900 nm. Each of the nanofibers 16 has a fiber length of beneficially 0.3 mm or longer, and of more beneficially 0.5 mm or longer. Furthermore, the fiber length is beneficially 5 mm or shorter, more beneficially 4 mm or shorter, and further beneficially 2 mm or shorter. The nanofiber 16 has a ratio of its fiber length to its fiber diameter (an aspect ratio) of beneficially 500 or greater, and more beneficially 1,000 or greater. Furthermore, the ratio is beneficially 10,000 or smaller, more beneficially 7,000 or smaller, and further beneficially 3,000 or smaller. Here, the fiber diameter and the fiber length of the nanofiber 16 may be measured by observation with an electronic microscope such as a scanning electron microscope (SEM).

Examples of the nanofibers 16 include nanofibers made of polyethylene terephthalate (PET) fibers, 6-nylon fibers, and 6,6-nylon fibers. Among these nanofibers, the nanofibers 16 beneficially include those of PET fibers. The nanofibers 16 may include a single kind of fibers alone. Alternatively, the nanofibers 16 may include multiple kinds of fibers.

The content of the nanofibers 16 in the rubber composition forming the compressed rubber layer 11 is beneficially, for 100 parts by mass of the rubber component, 1 part by mass or more, and more beneficially 2 parts by mass or more in view of providing a higher elasticity to the compressed rubber layer 11 along the belt width. Furthermore, the content is beneficially 20 parts by mass or less, more beneficially 15 parts by mass or less, and further beneficially 10 parts by mass or less in view of achieving higher workability.

The volume fraction of the nanofibers 16 in the rubber composition forming the compressed rubber layer 11 is beneficially 0.4% or greater by volume, and more beneficially 0.8% or greater by volume in view of providing a higher elasticity to the compressed rubber layer 11 along the belt width. Furthermore, the volume fraction is beneficially 8.0% or smaller by volume, and more beneficially 6.0% or smaller by volume in view of achieving higher workability.

The organic short fibers 17 are also included in the rubber composition forming the compressed rubber layer 11 to be oriented along the belt width. A portion of the organic short fibers 17 exposed to the V-shaped side faces 110 protrudes from the V-shaped side faces 110.

Each of the organic short fibers 17 has a fiber diameter of 10 μm or larger, of beneficially 50 μm or smaller, and of more beneficially 30 μm or smaller. Each of the organic short fibers 17 has a fiber length of beneficially 1.5 mm or longer, and of more beneficially 2.0 mm or longer. The fiber length is beneficially, 10 mm or shorter, more beneficially 8 mm or shorter, and further beneficially 4 mm or shorter. The organic short fiber 17 has a ratio of its fiber length to its fiber diameter (an aspect ratio) of beneficially 100 or greater, of more beneficially 150 or greater, and of further beneficially 200 or greater. The ratio is beneficially 500 or smaller, more beneficially 400 or smaller, and further beneficially 300 or smaller. Here, the fiber diameter and the fiber length of the organic short fiber 17 may be measured with a microscope.

The organic short fibers 17 protrude from the V-shaped side faces 110 in a length beneficially ranging from 0.01 mm to 5.0 mm, and more beneficially ranging from 0.05 mm to 2.0 mm. Here, the protruding length of the organic short fibers 17 may be measured by observation with an electronic microscope such as an SEM.

Examples of the organic short fibers 17 include short fibers such as: synthetic fibers such as 6-nylon fibers, 6,6-nylon fibers, 4,6-nylon fibers, PET fibers, polyethylene naphthalate (PEN) fibers, para-aramid fibers, meta-aramid fibers, poly-phenylene-benzobisoxazole (PBO) fibers; natural fibers such as cotton and linen; and regenerated fibers such as rayon. Among those short fibers, the organic short fibers 17 beneficially include one or two kinds of short fibers or more of 6-nylon fibers, 6,6-nylon fibers, 4,6-nylon fibers, PET fibers, and para-aramid fibers. The organic short fibers 17 may include a single kind of fibers alone. Alternatively, the organic short fibers 17 may include multiple kinds of fibers.

The organic short fibers 17 may receive, for example, an adhesion treatment; that is, the organic short fibers 17 are immersed in resorcin-formalin-latex aqueous solution (hereinafter referred to as "RFL aqueous solution") and heated. Alternatively, the organic short fibers 17 do not have to receive such an adhesion treatment.

The content of the organic short fibers 17 in the rubber composition forming the compressed rubber layer 11 is beneficially, for 100 parts by mass of the rubber component, 5 parts by mass or more, and more beneficially 10 parts by mass or more in view of reducing the friction coefficient of the V-shaped side faces 110. Furthermore, the content is beneficially 20 parts by mass or less, and more beneficially 15 parts by mass or less in view of achieving higher workability.

The volume fraction of the organic short fibers 17 in the rubber composition forming the compressed rubber layer 11 is beneficially 3% or greater by volume, and more beneficially 4% or greater by volume. Furthermore, the volume fraction is beneficially 8% or smaller by volume, and more beneficially 7% or smaller by volume.

The nanofibers 16 and organic short fibers 17 may be either identical or different in kind. Specifically, for example, the rubber composition forming the compressed rubber layer 11 may include the nanofibers 16 made of PET fibers, and the organic short fibers 17 made of 6,6-nylon fibers or para-aramid fibers. Alternatively, the rubber composition may include the nanofibers 16 and organic short fibers 17 made of PET fibers.

The content mass of the nanofibers 16 in the rubber composition forming the compressed rubber layer 11 is beneficially smaller than or equal to the content mass of the organic short fibers 17, and more beneficially smaller than the content mass of the organic short fibers 17. The ratio of the content mass of the nanofibers 16 to that of the organic short fibers 17 is beneficially 0.05 or higher, and more beneficially 0.10 or higher. Furthermore, the ratio is beneficially 1.00 or lower, and more beneficially 0.95 or lower.

The total sum of the content masses of the nanofibers 16 and organic short fibers 17 in the rubber composition forming the compressed rubber layer 11 is, for 100 parts by mass of the rubber component, beneficially 1.0 part by mass or more, more beneficially 2.0 parts by mass or more, and further beneficially 10 parts by mass or more. Furthermore, the total sum of the content masses is beneficially 25.0 parts by mass or less, more beneficially 20.0 parts by mass or less, and further beneficially 18.0 parts by mass or less.

The volume fraction of the nanofibers 16 in the rubber composition forming the compressed rubber layer 11 is beneficially smaller than or equal to that of the organic short fibers 17. The volume fraction of the nanofibers 16 is beneficially smaller than that of the organic short fibers 17. The ratio of the volume fraction of the nanofibers 16 to that of the organic short fibers 17 is beneficially 0.05 or higher, and more beneficially 0.10 or higher. Furthermore, the ratio is beneficially 1.00 or lower, and more beneficially 0.95 or lower.

The total sum of volume fractions of the nanofibers 16 and organic short fibers 17 in the rubber composition forming the compressed rubber layer 11 is beneficially 5% or greater by volume, and more beneficially 5.5% or greater by volume. Furthermore, the volume fraction is beneficially 8% or smaller by volume, and more beneficially 7.5% or smaller by volume.

Examples of the rubber compounding ingredients include stiffener, plasticizer, process oil, processing aid, vulcanization accelerator, vulcanization accelerating aid, antioxidant, and crosslinker.

Examples of the stiffener include carbon black and silica. Examples of the carbon black include: furnace black such as SAF, ISAF, N-339, HAF, N-351, MAF, FEF, SRF, GPF, ECF, and N-234; and thermal black such as FT and MT. The stiffener may include a single kind of stiffener alone. Alternatively, the stiffener may include multiple kinds of stiffener. For 100 parts by mass of the rubber component, the content of the stiffener ranges beneficially from 30 parts by mass to 80 parts by mass, and more beneficially from 40 parts by mass to 70 parts by mass.

Examples of the plasticizer include: dialkyl phthalate such as dibutyl phthalate (DBP), and dioctyl phthalate (DOP); dialkyl adipate such as dioctyl adipate (DOA); and dialkyl sebacate such as dioctyl sebacate (DOS). The plasticizer may include a single kind of plasticizer alone. Alternatively, the stiffener may include multiple kinds of plasticizer. For 100 parts by mass of the rubber component, the content of the plasticizer ranges beneficially from 0.1 part by mass to 40 parts by mass, and more beneficially from 0.1 parts by mass to 20 parts by mass.

Examples of the process oil include paraffinic oil, naphthenic oil, and aromatic oil. The process oil may include a single kind of process oil. Alternatively, the process oil may include multiple kinds of process oil. For 100 parts by mass of the rubber component, the content of the process oil ranges beneficially from 0.1 part by mass to 40 parts by mass, and more beneficially from 0.1 parts by mass to 20 parts by mass. Note that "SUMPAR 2280" produced by, for example, Japan Sun Oil Co. Ltd. is commonly known as commercially available process oil achieving smaller loss by volatilization and excellent heat resistance.

Examples of the processing aid include stearic acid, polyethylene wax, and fatty acid metal salt. The processing aid may include a single kind of processing aid alone. Alternatively, the processing aid may include multiple kinds of processing aid. For 100 parts by mass of the rubber component, the content of the processing aid ranges from 0.1 part by mass to 3 parts by mass, for example.

Examples of the vulcanization accelerator include thiuram-based vulcanization accelerator (e.g., TET), dithiocarbamate-based vulcanization accelerator (e.g., EZ), and sulfonamide-based vulcanization accelerator (e.g., MSA). The vulcanization accelerator may include a single kind of vulcanization accelerator alone. Alternatively, the vulcanization accelerator may include multiple kinds of vulcanization accelerator. For 100 parts by mass of the rubber component, the content of the vulcanization accelerator ranges from 2 parts by mass to 10 parts by mass, for example.

Examples of the vulcanization accelerating aid include: metal oxide such as magnesium oxide and zinc oxide; metal carbonate; and fatty acid such as stearic acid and a derivative of the fatty acid. The vulcanization accelerating aid may include a single kind of vulcanization accelerating aid alone. The vulcanization accelerating aid may also include multiple kinds of vulcanization accelerating aid. For 100 parts by mass of the rubber component, the content of the vulcanization accelerating aid ranges from 0.5 part by mass to 8 parts by mass, for example.

Examples of the antioxidant include diamine-based antioxidant and phenol-based antioxidant. The antioxidant may include a single kind of antioxidant alone. The antioxidant may also include multiple kinds of antioxidant. For 100 parts by mass of the rubber component, the content of the antioxidant ranges beneficially from 0.1 part by mass to 5 parts by mass, and more beneficially from 0.5 part by mass to 3 parts by mass.

Examples of the crosslinker include organic peroxide and sulfur. Organic peroxide is beneficial as the crosslinker in view of higher heat resistance. Examples of the organic peroxide include dialkyl peroxides such as dicumyl peroxide, peroxy esters such as t-butyl peroxyacetate, and ketone peroxides such as dicyclohexanone peroxide. The organic peroxide may include a single kind of organic peroxide alone. Alternatively, the stiffener may include multiple kinds of organic peroxide. For 100 parts by mass of the rubber component, the content of the organic peroxide ranges beneficially from 0.5 part by mass to 10 parts by mass, and more beneficially from 1 part by mass to 6 parts by mass.

If organic peroxide is used as the crosslinker, co-crosslinker may also be included. Examples of the co-crosslinker include trimethylolpropane trimethacrylate, ethylene glycol dimethacrylate, triallyl isocyanurate, liquid polybutadiene, and N,N'-m-Phenylenebismaleimide. The co-crosslinker may include a single kind of co-crosslinker alone. Alternatively, the co-crosslinker may include multiple kinds of co-crosslinker. For 100 parts by mass of the rubber component, the content of the co-crosslinker ranges beneficially from 0.5 part by mass to 10 parts by mass, and more beneficially from 2 parts by mass to 7 parts by mass.

The rubber composition forming the compressed rubber layer 11 includes thermoplastic resin for a composite material to be described later. For 100 parts by mass of the rubber component, the content of the thermoplastic resin ranges from 1 part by mass to 7 parts by mass, for example.

Other than the thermoplastic resin, the rubber composition forming the compressed rubber layer 11 may include a filler such as calcium carbonate, talc, and diatomaceous earth, a stabilizer, and a colorant.

Hardness of the rubber composition forming the compressed rubber layer 11 is measured with a type A durometer based on JIS K6253. The hardness is beneficially 80° or higher, and more beneficially 85° or higher. Furthermore, the hardness is beneficially 98° or lower, and more beneficially 95° or lower.

In the rubber composition forming the compressed rubber layer 11, a tensile stress ($M_{10}$) measured based on JIS K6251 at 10% elongation along the belt width—a grain direction in the orientation of the nanofibers 16 and the organic short fibers 17—is beneficially 3 MPa or greater, and more beneficially 5 MPa or greater. Furthermore, the tensile stress ($M_{10}$) is beneficially 40 MPa or smaller, and more beneficially 30 MPa or smaller.

In the rubber composition forming the compressed rubber layer 11, a tensile strength ($T_B$), measured based on JIS K6251 and applied in the grain direction along the belt width, is beneficially 8 MPa or greater, and more beneficially 10 MPa or greater. Furthermore, the tensile strength ($T_B$) is beneficially 50 MPa or smaller, and more beneficially 40 MPa or smaller.

In the rubber composition forming the compressed rubber layer 11, an elongation at break ($E_B$), measured based on JIS K6251 and observed in the grain direction along the belt width, is beneficially 20% or greater, and more beneficially 30% or greater. Furthermore, the elongation at break ($E_B$) is beneficially 300% or smaller, and more beneficially 250% or smaller.

In the rubber composition forming the compressed rubber layer 11, a tensile stress ($M_{10}$) measured based on JIS K6251 at 10% elongation along the belt length—a cross-grain direction perpendicular to the orientation of the nanofibers 16 and the organic short fibers 17—is beneficially 0.5 MPa or greater, and more beneficially 0.8 MPa or greater. Furthermore, the tensile stress ($M_{10}$) is beneficially 10 MPa or smaller, and more beneficially 8 MPa or smaller.

In the rubber composition forming the compressed rubber layer 11, a tensile stress ($M_{50}$) measured based on JIS K6251 at 50% elongation along the belt length—the cross-grain direction—is beneficially 1.0 MPa or greater, and more beneficially 1.5 MPa or greater. Furthermore, the tensile stress ($M_{50}$) is beneficially 20 MPa or smaller, and more beneficially 15 MPa or smaller.

In the rubber composition forming the compressed rubber layer 11, a tensile strength ($T_B$), measured based on JIS K6251 and applied in the cross-grain direction along the belt length, is beneficially 5 MPa or greater, and more beneficially 8 MPa or greater. Furthermore, the tensile strength ($T_B$) is beneficially 20 MPa or smaller, and more beneficially 18 MPa or smaller.

In the rubber composition forming the compressed rubber layer 11, an elongation at break ($E_B$), measured based on JIS K6251 and observed in the cross-grain direction along the belt width, is beneficially 50% or greater, and more beneficially 70% or greater. Furthermore, the elongation at break ($E_B$) is beneficially 400% or smaller, and more beneficially 300% or smaller.

In the rubber composition forming the compressed rubber layer 11, a ratio of the tensile stress ($M_{10}$) at 10% elongation in the grain direction along the belt width to the tensile stress ($M_{10}$) at 10% elongation in the cross-grain direction along the belt length is beneficially 3 or greater, and more beneficially 5 or greater. Furthermore, the ratio is beneficially 20 or smaller, and more beneficially 18 or smaller.

In the rubber composition forming the compressed rubber layer 11, a storage modulus ($E'$), measured based on JIS K6394 and observed in the grain direction along the belt width, is beneficially 50 MPa or greater, and more beneficially 80 MPa or greater. Furthermore, the storage modulus (E') is beneficially 2,000 MPa or smaller, and more beneficially 1,500 MPa or smaller. A storage modulus (E') in the grain direction is measured with the rubber composition stretched at a mean strain which is a strain under a load 1.3 times greater than the load at a strain of 1%, a strain amplitude of 0.1%, a frequency of 10 Hz, and a test temperature of 100° C.

In the rubber composition forming the compressed rubber layer 11, a loss factor (tan δ), measured based on JIS K6394 and observed in the grain direction along the belt width, is beneficially 0.02 or greater, and more beneficially 0.04 or greater. Furthermore, the loss factor (tan δ) is beneficially 0.20 or smaller, and more beneficially 0.17 or smaller. A loss factor (tan δ) in the grain direction is measured with the rubber composition stretched at the mean strain that is a strain under a load 1.3 times greater than the load at a strain of 1%, a strain amplitude of 0.1%, a frequency of 10 Hz, and a test temperature of 100° C.

In the rubber composition forming the compressed rubber layer 11, a storage modulus (E'), measured based on JIS K6394 and observed in the cross-grain direction along the belt length, is beneficially 10 MPa or greater, and more beneficially 15 MPa or greater. Furthermore, the storage modulus (E') is beneficially 100 MPa or smaller, and more beneficially 80 MPa or smaller. This storage modulus (E') in the cross-grain direction is measured with the rubber composition stretched where a mean strain is 5%, a strain amplitude is 1%, a frequency is 10 Hz, and a test temperature is 100° C.

In the rubber composition forming the compressed rubber layer 11, a loss factor (tan δ), measured based on JIS K6394 and observed in the cross-grain direction along the belt length, is beneficially 0.05 or greater, and more beneficially 0.07 or greater. Furthermore, the loss factor (tan δ) is beneficially 0.20 or smaller, and more beneficially 0.17 or smaller. This loss factor (tan δ) in the cross-grain direction is also measured with the rubber composition stretched where a mean strain is 5%, a strain amplitude is 1%, a frequency is 10 Hz, and a test temperature is 100° C.

In the rubber composition forming the compressed rubber layer 11, a ratio of the storage modulus (E') in the grain direction along the belt width to the storage modulus (E') in the cross-grain direction along the belt length is beneficially 5 or greater, and more beneficially 6 or greater. The ratio is beneficially 20 or smaller, and more beneficially 18 or smaller.

The adhesive rubber layer 12 is formed into a belt of which the cross section is horizontally-long quadrilateral. The thickness of the adhesive rubber layer 11 ranges from 1.0 mm to 2.5 mm, for example. The adhesive rubber layer 12 is formed of a rubber composition. The rubber composition is made of an uncrosslinked rubber composition including a rubber component mixed and kneaded together with various kinds of rubber compounding ingredients. The uncrosslinked rubber composition is then heated and pressurized, and crosslinked by a crosslinker to become the rubber composition.

Similar to the case of the compressed rubber layer 11, examples of the rubber component for the rubber composition forming the adhesive rubber layer 12 include ethylene-α-olefin elastomer. Beneficially, the adhesive rubber layer 12 and the compressed rubber layer 11 may include the same rubber component for the rubber composition. If the same rubber component is used, the adhesive rubber layer 12 and the compressed rubber layer 11 may be formed of the same rubber composition. Similar to the case of the compressed rubber layer 11, examples of the rubber compounding ingredients include stiffener, plasticizer, process oil, processing aid, vulcanization accelerator, vulcanization accelerating aid, antioxidant, and crosslinker. The rubber composition forming the adhesive rubber layer 12 may include the nanofibers 16. Alternatively, the rubber composition does not have to include the nanofibers 16. The rubber composition forming the adhesive rubber layer 12 may include the organic short fibers 17. Alternatively, the rubber composition does not have to include the organic short fibers 17.

Figure 3:
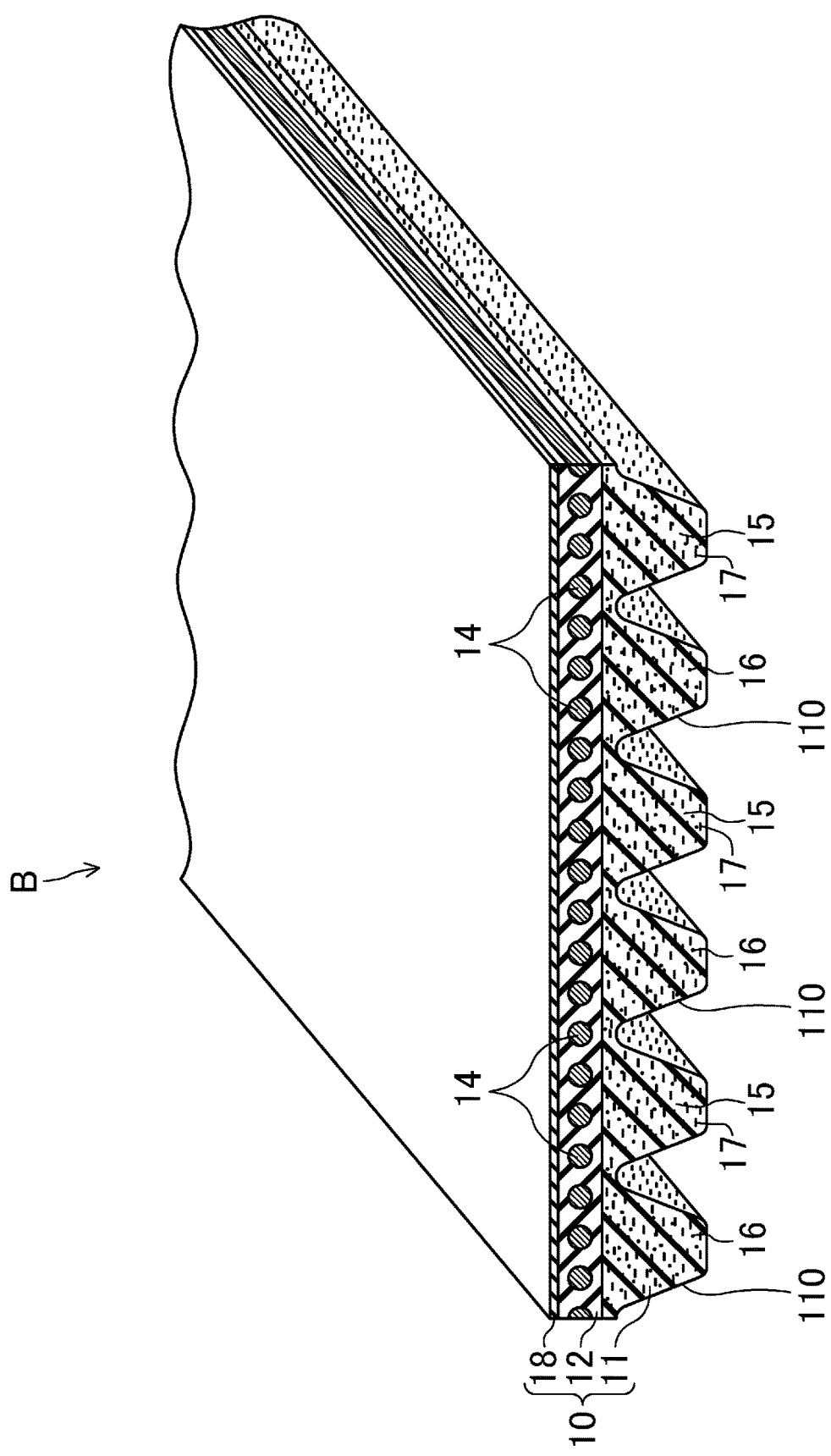
FIG. 3 is a perspective view illustrating a portion cut out from the V-ribbed belt in a modified example according to the first embodiment.

The back surface reinforcing fabric 13 comprises, for example, fabric materials such as a woven fabric, a knit fabric, and a non-woven fabric which are made of yarns including cotton, polyamide fibers, PET fibers, para-aramid fibers, and meta-aramid fibers. The back surface reinforcing fabric 13 receives an adhesion treatment to have a property adhesive to the V-ribbed belt body 10. The adhesion treatment includes, before forming processing, immersing the back surface reinforcing fabric 13 in an RFL aqueous solution and heating the immersed fabric. An alternative adhesion treatment, which can be provided alone or together with the former adhesion treatment, includes immersing the back surface reinforcing fabric 13 in rubber cement, and drying the immersed fabric. The back surface reinforcing fabric 13 has a thickness ranging from 0.5 mm to 3 mm, for example. Note that, as illustrated in FIG. 3, a back surface rubber layer 18 may be provided instead of the back surface reinforcing fabric 13, and the V-ribbed belt body 10 may be formed of three layers including the compressed rubber layer 11, the adhesive rubber layer 12, and the back surface rubber layer 18.

The cord 14 includes a wire including a twisted yarn and a braid. The twisted yarn and the braid include PET fibers, PEN fibers, para-aramid fibers, and vinylon fibers. The cord 14 receives an adhesion treatment to have a property adhesive to the V-ribbed belt body 10. The adhesion treatment includes, before forming processing, immersing the cord 14 in an RFL aqueous solution and heating the immersed cord. An alternative adhesion treatment, which can be provided alone or together with the former adhesion treatment, includes immersing the cord 14 in rubber cement, and drying the immersed cord. Note that, before the adhesion treatment with the RFL aqueous solution and/or the rubber cement, the cord 14 may receive another adhesion treatment as needed. The adhesion treatment includes immersing the cord 14 in an adhesive solution including an epoxy resin solution and a polyisocyanate resin solution, and heating the immersed cord. The cord 14 has an outer diameter ranging from 0.1 mm to 2 mm, for example.

In a typical V-belt, such as a V-ribbed belt including a compressed rubber layer having V-shaped side faces and formed of a rubber composition, the rubber composition forming the compressed rubber layer includes organic short fibers such that the organic short fibers are oriented along the belt width, in order to resist high lateral pressure applied from a pulley. Such organic short fibers enhance elasticity along the belt width without increasing bending stiffness of the V-belt. However, if more organic short fibers are included to achieve even higher elasticity along the belt width, the rubber composition, forming the compressed rubber layer, experiences a decrease in elongation at break along the belt length, and an increase in elasticity. The resulting problem poses the development of a crack when the V-belt starts to run, followed by deterioration in flex fatigue resistance.

However, the V-ribbed belt B according to the first embodiment as described above comprises a rubber composition, forming the compressed rubber layer 11 having a portion to be the V-shaped side faces 110, which includes the nanofibers 16 and the organic short fibers 17 oriented along the belt width. Out of these fibers, the nanofibers 16 provide the rubber composition, which forms the compressed rubber layer 11 with little content, with higher elasticity along the belt width and fewer effects to a physical property along the belt length. Resulting from these features, the anisotropy of the rubber composition forming the compressed rubber layer 11 is high because the ratio of the storage modulus in the grain direction along the belt width to the storage modulus in the cross-grain direction along the belt length is 5 or higher. As a result, the V-ribbed belt B achieves excellent flex fatigue resistance because of its high elasticity along the belt width, and comparatively not-so-high elasticity along the belt length. Moreover, since the rubber composition forming the compressed rubber layer 11 achieves high anisotropy, the V-ribbed belt B causes little energy loss by bending, and as a result, successfully transmits power at high efficiency. Furthermore, a portion of the organic short fibers 17 exposed to the V-shaped side faces 110 protrudes from the V-shaped side faces 110. Such a feature may reduce the friction coefficient of the V-shaped side faces 110, contributing to less abnormal noise caused by the friction between a pulley and the V-shaped side faces 110, and higher wear resistance.

Figure 4:
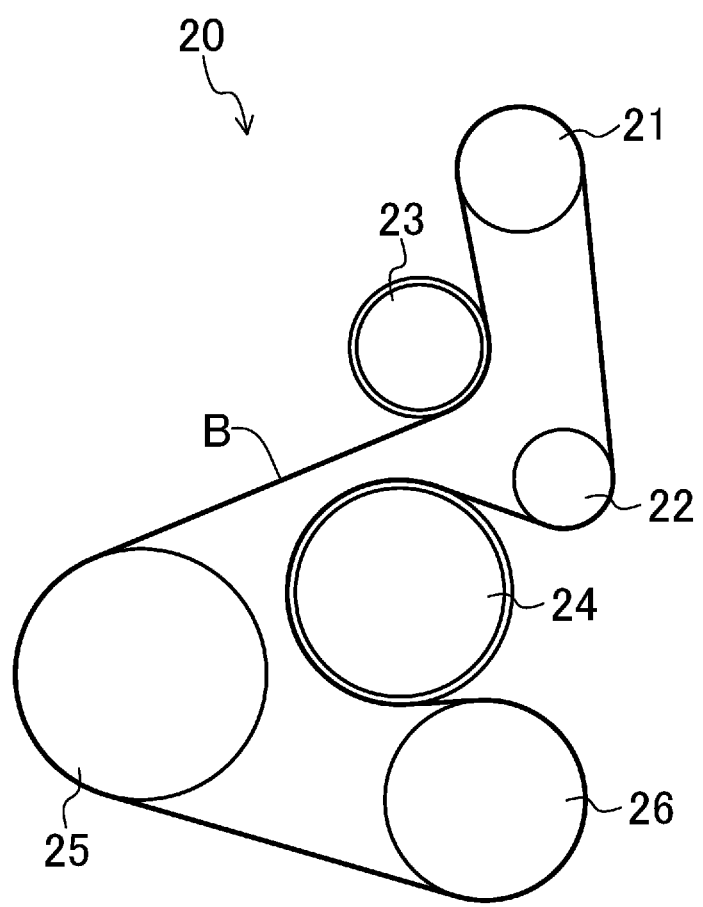
FIG. 4 illustrates a layout of pulleys of an accessory drive belt transmission system, for cars, using the V-ribbed belt according to the first embodiment.

FIG. 4 illustrates a layout of pulleys of an accessory drive belt transmission system 20, for cars, using the V-ribbed belt B according to the first embodiment. This accessory drive belt transmission system 20 is a serpentine drive system in which the V-ribbed belt B is looped over six pulleys—four rib-belt pulleys and two flat-belt pulleys—to transmit power.

The accessory drive belt transmission system 20 includes a power steering pulley 21 located uppermost, an AC generator pulley 22 disposed slightly diagonally downward right of the power steering pulley 21, a tensioner pulley 23 (a flat-belt pulley) disposed diagonally downward left of the power steering pulley 21 and diagonally upward left of the AC generator pulley 22, a water pump pulley 24 (a flat-belt pulley) disposed diagonally downward left of the AC generator pulley 22 and immediately below the tensioner pulley 23, a crankshaft pulley 25 disposed diagonally downward left of the tensioner pulley 23 and the water pump pulley 24, and an air-conditioner pulley 26 disposed diagonally downward right of the water pump pulley 24 and the crankshaft pulley 25. Among these pulleys, all the pulleys other than the tensioner pulley 23 and the water pump pulley 24—flat-belt pulleys—are ribbed pulleys. These ribbed pulleys and flat-belt pulleys include stamped parts out of metal, metal castings, and resin moldings made of nylon resin and phenol resin, for example. Moreover, these ribbed pulleys have a pulley diameter ranging from φ50 mm to φ150 mm.

In the accessory drive belt transmission system 20, the V-ribbed belt B is provided to loop over the following pulleys in the stated order: the power steering pulley 21 so that the face to the V-shaped rib 15 touches the pulley 21; the tensioner pulley 23 so that the belt back surface touches the pulley 23; and the crankshaft pulley 25 and the air conditioner pulley 26 so that the face to the V-shaped rib 15 touches the pulleys 25 and 26. Furthermore, the V-ribbed belt B is provided to loop over the water pump pulley 24 so that the belt back surface touches the pulley 24, then loop over the AC generator pulley 22 so that the V-shaped rib 15 touches the pulley 22, and finally come back to the power steering pulley 21.

Described next is an example of how to produce the V-ribbed belt B according to the first embodiment, with reference to FIGS. 5 to 9.

—Member Preparation Step—

A member preparation step includes the following: kneading a rubber component with a composite material having a matrix-domain structure, including a matrix having thermoplastic resin and many domains formed of a bundle of organic nanofibers having a fiber diameter ranging from 300 μm to 1,000 μm, at a temperature higher than or equal to the melting point or the softening temperature of the thermoplastic resin in the composite material, and additionally kneading together with the organic short fibers 17 having a fiber diameter of 10 μm or larger, for producing a kneaded body of an uncrosslinked rubber composition including the rubber component in which the nanofibers 16 and the organic short fibers 17 are dispersed (a knead body preparing step); and rolling the prepared kneaded body of the uncrosslinked rubber composition to produce an uncrosslinked rubber composition sheet to be used for forming the compressed rubber layer 11 having the V-shaped side faces 110 (a rolling step).

Specifically, first, a component other than a crosslinker, a co-crosslinker, the composite material including the thermoplastic resin and the nanofibers 16, and the organic short fibers 17 is put into an internal mixer such as a Banbury mixer, and kneaded with predetermined energy. The composite material is added to the kneaded component, and the component is further kneaded at a temperature higher than or equal to the melting point or the softening temperature of the thermoplastic resin in the composite material. Here, in the composite material, the thermoplastic resin melts or softens to disperse throughout the rubber component. Concurrently, the bundle of the nanofibers 16 is opened by shear force, and the nanofibers 16 disperse throughout the rubber component. Moreover, as described above, kneading together with the composite material successfully achieves high dispersibility of the nanofibers 16 in the rubber component.

Figure 5:
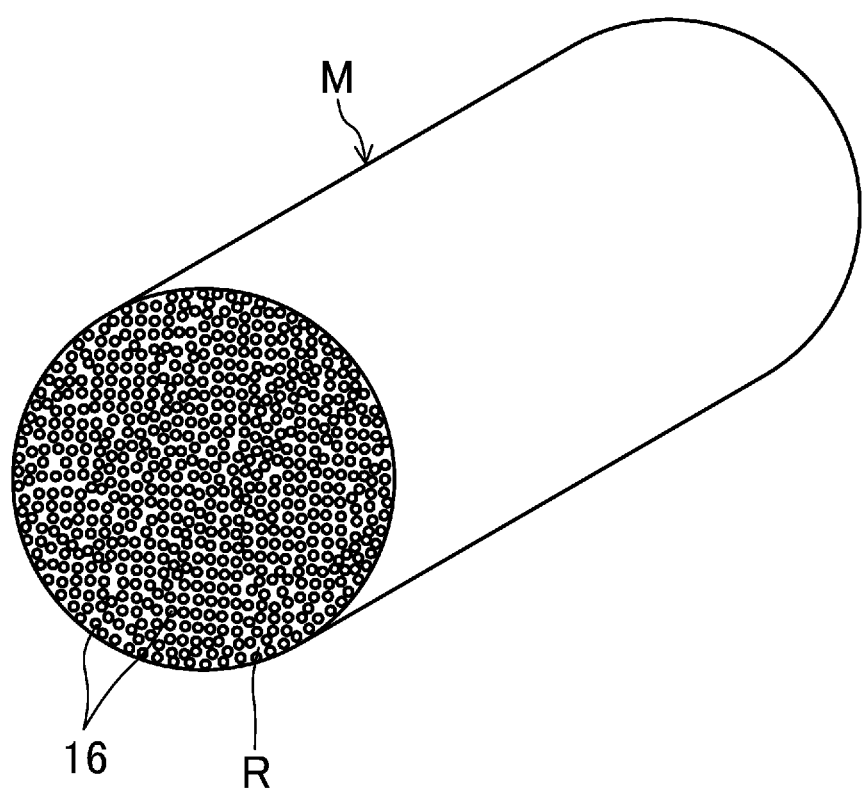
FIG. 5 is a perspective view of a composite material.

Here, as illustrated in FIG. 5, a composite material M is made of conjugated fibers cut into a rod. The conjugated fibers have a matrix polymer of thermoplastic resin R including the nanofibers 16 separately arranged in parallel with one another as domains.

Example of the thermoplastic resin R include polyethylene resin, an ethylene-vinylacetate copolymer, nylon resin, and urethane resin. The thermoplastic resin R disperses into the rubber component when kneaded, and beneficially has high compatibility with the rubber component. From this viewpoint, the thermoplastic resin R is beneficially polyethylene resin and an ethylene-vinylacetate copolymer with low polarity if the rubber component is low in polarity. Specifically, the thermoplastic resin R is beneficially polyethylene resin if the rubber component is ethylene-α-olefin elastomer. Furthermore, the thermoplastic resin R may be, for example, nylon resin, urethane resin, and polyethylene resin modified with introduction of a polar group such as maleic acid, if the rubber component is high in polarity such as nitrile rubber (NBR).

The melting point or the softening temperature of the thermoplastic resin R is beneficially 70° C. or higher, and more beneficially 90° C. or higher. Furthermore, the melting point or the softening temperature is 150° C. or lower, and more beneficially 140° C. or lower. For the thermoplastic resin R including a crystalline polymer, the melting point is measured by differential scanning calorimetry (DSC). For the thermoplastic resin R including an amorphous polymer, the softening temperature is a Vicat softening temperature measured based on JIS K7206. For example, the melting point of low-density polyethylene resin (LDPE) ranges from 95° C. to 130° C. The melting point of high-density polyethylene resin (HDPE) ranges from 120° C. to 140° C. The melting point of the ethylene-vinylacetate copolymer (EVA) ranges from 65° C. to 90° C. The melting point of ultra high-molecular-weight polyethylene resin (UHMWPE) ranges from 125° C. to 135° C.

As described above, examples of the nanofibers 16 include nanofibers such as PET fibers, 6-nylon fibers, and 6,6-nylon fibers.

In view of higher workability, the composite material M has an outer diameter of beneficially 10 μm or larger, and more beneficially 15 μm or larger. Furthermore, the outer diameter is beneficially 100 μm or smaller, and more beneficially 80 μm or smaller. In view of lower cost for materials, the composite material M has a fiber length of beneficially 0.5 mm or longer. Furthermore, in view of higher dispersibility of the nanofibers 16, the fiber length is beneficially 5 mm or shorter, and more beneficially 2 mm or shorter. The composite material M has a ratio of its length to its outer diameter (an aspect ratio) of beneficially 20 or greater, and more beneficially 30 or greater. Furthermore, the aspect ratio is beneficially 700 or smaller, and more beneficially 500 or smaller.

The content of the nanofibers 16 in the composite material M is beneficially 30% by mass or greater, and more beneficially 50% by mass or greater. Furthermore, the content is 95% by mass or smaller, and more beneficially 90% by mass or smaller. The number of the nanofibers 16 in the composite material M ranges from 100 to 1,000, for example.

Next, the kneaded body of the uncrosslinked rubber composition in a solid state is taken out of the internal mixer, and cooled for a while. Together with organic short fibers 17 and the crosslinker, the cooled kneaded body is put into a mixer such as an open roll mill, a kneader, and a Banbury mixer, and kneaded. Here, the organic short fibers 17 and the crosslinker disperse into the rubber component.

Then, the kneaded body of the uncrosslinked rubber composition in the solid state is taken out of the mixer, and calendered by a calender into an uncrosslinked rubber composition sheet for forming the compressed rubber layer 11. The uncrosslinked rubber composition sheet includes the nanofibers 16 and the organic short fibers 17 oriented in the grain direction; that is, the direction in which the uncrosslinked rubber composition sheet is rolled out of the calender.

Similarly, the member preparation step includes producing an uncrosslinked rubber composition sheet for forming the adhesive rubber layer 12. The member preparation step further includes providing a fabric material to be the back surface reinforcing fabric 13 and a wire to be the cord 14 with respective predetermined adhesion treatments.

—Forming and Crosslinking Step—

Figure 6A:
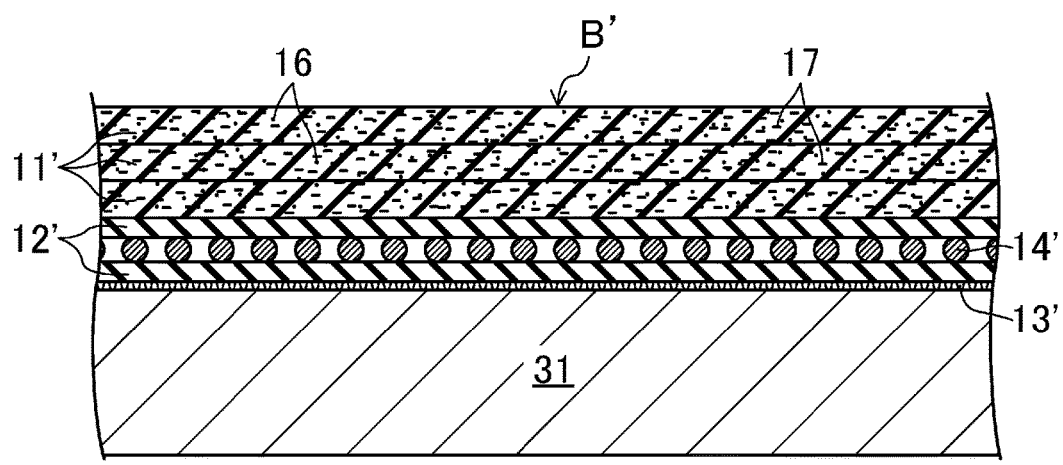
FIGS. 6A and 6B are first illustrations showing how to produce the V-ribbed belt according to the first embodiment.

First, in a forming and crosslinking step as illustrated in FIG. 6A, a fabric material 13' to be the back surface reinforcing fabric 13 and an uncrosslinked rubber composition sheet 12' for forming the adhesive rubber layer 12 are wrapped and stacked one another in the stated order over an outer circumferential surface of a cylindrical mold 31. Then, a wire 14' to be the cord 14 is helically wound on the uncrosslinked rubber composition sheet 12' with respect to the cylindrical mold 31. Furthermore, another uncrosslinked rubber composition sheet 12' for forming the adhesive rubber layer 12 and an uncrosslinked rubber composition sheet 11' for forming the compressed rubber layer 11 are wrapped and stacked one another in the stated order on the wire 14'. Then, a belt product B' is formed. Here, the uncrosslinked rubber composition sheet 11' for forming the compressed rubber layer 11 is provided such that the grain direction of the uncrosslinked rubber composition sheet 11' is oriented in the axial direction of the cylindrical mold 31; that is, along the belt width.

Figure 6B:
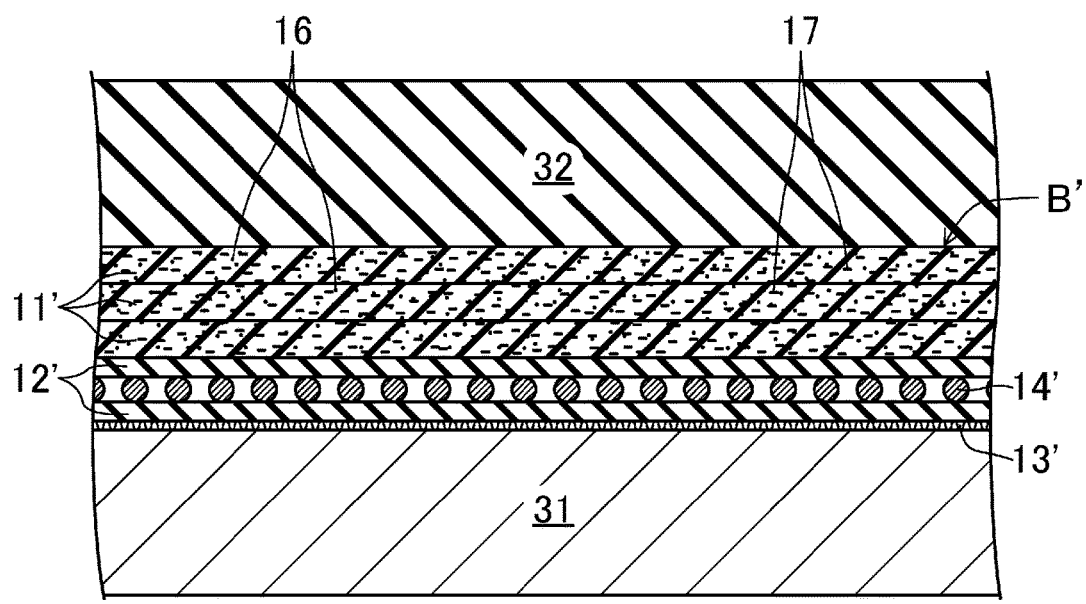
Figure 7:
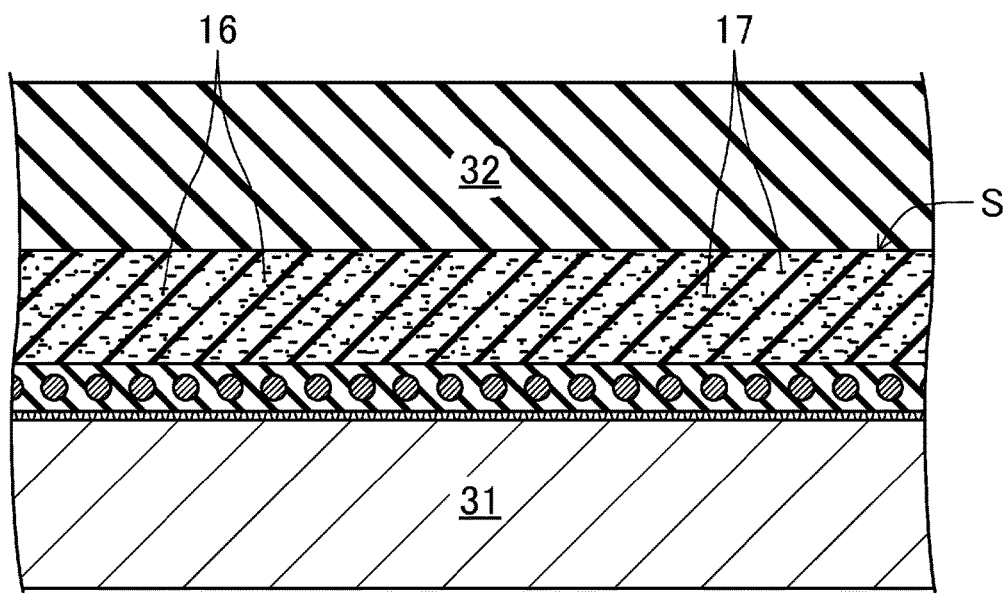
FIG. 7 is a second illustration showing how to produce the V-ribbed belt according to the first embodiment.

Next, as illustrated in FIG. 6B, the belt product B' is covered with a rubber sleeve 32, and disposed in a vulcanizer. The vulcanizer is then hermetically sealed, filled with high-temperature and high-pressure steam, and left in this condition for a predetermined time period. During the predetermined time period, the uncrosslinked rubber composition sheets 11' and 12' continuously crosslink to be integrated into one, and combine with the fabric material 13' and the wire 14'. Finally, a cylindrical belt slab S is molded as illustrated in FIG. 7. For example, the belt slab S has a molding temperature ranging from 100° C. to 180° C., a molding pressure ranging from 0.5 MPa to 2.0 MPa, and a molding time period ranging from 10 minutes to 60 minutes.

—Grinding and Finishing Step—

The steam in the vulcanizer is released and the vulcanizer is unsealed. After that, the cylindrical mold 31 is taken out of the vulcanizer, the rubber sleeve 32 is removed and cooled, and the belt slab S is demolded from the cylindrical mold 31.

Figure 8:
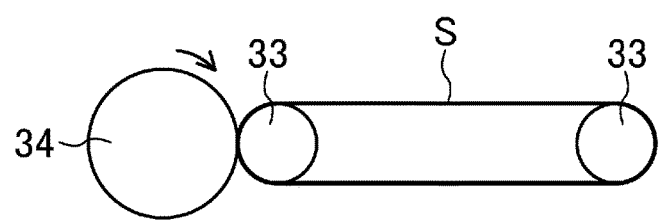
FIG. 8 is a third illustration showing how to produce the V-ribbed belt according to the first embodiment.
Figure 9:
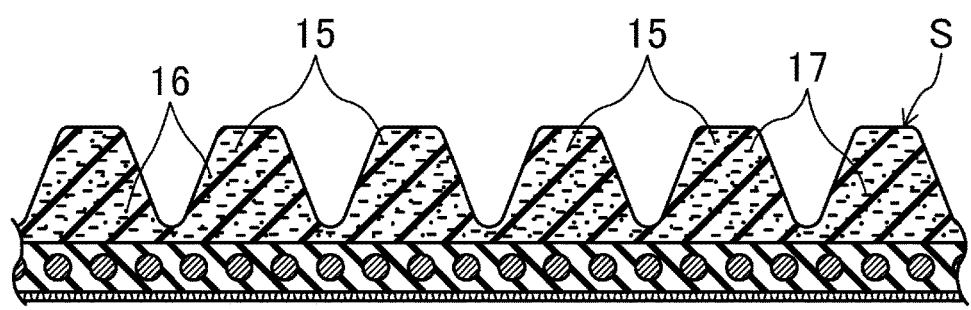
FIG. 9 is a fourth illustration showing how to produce the V-ribbed belt according to the first embodiment.

Next, as illustrated in FIG. 8, the belt slab S is run across a pair of slab suspension shafts 33. A spinning grinding wheel 34, provided with V-shaped rib grooves extending in a circumferential direction, comes into contact with the outer circumferential surface of the belt slab S. Here, the grinding wheel 34 is placed next to the outer surface of the belt slab S to face the outer surface. Furthermore, the belt slab S is spun across the pair of the slab suspension shafts 33, and the entire outer circumferential surface is ground. Here, as illustrated in FIG. 9, the V-shaped ribs 15 are formed on the outer circumferential surface of the belt slab S, with the organic short fibers 17 protruding from the surface of the V-shaped ribs 15. Note that, as needed, the belt slab S may be separately grinded along the belt length.

Hence, the belt slab S having the V-shaped ribs 15 formed by the grinding is sliced in a predetermined width. Each of the sliced belt slab S is turned inside out, so that the V-ribbed belt B according to the first embodiment is obtained.

(Second Embodiment)

Figure 10:
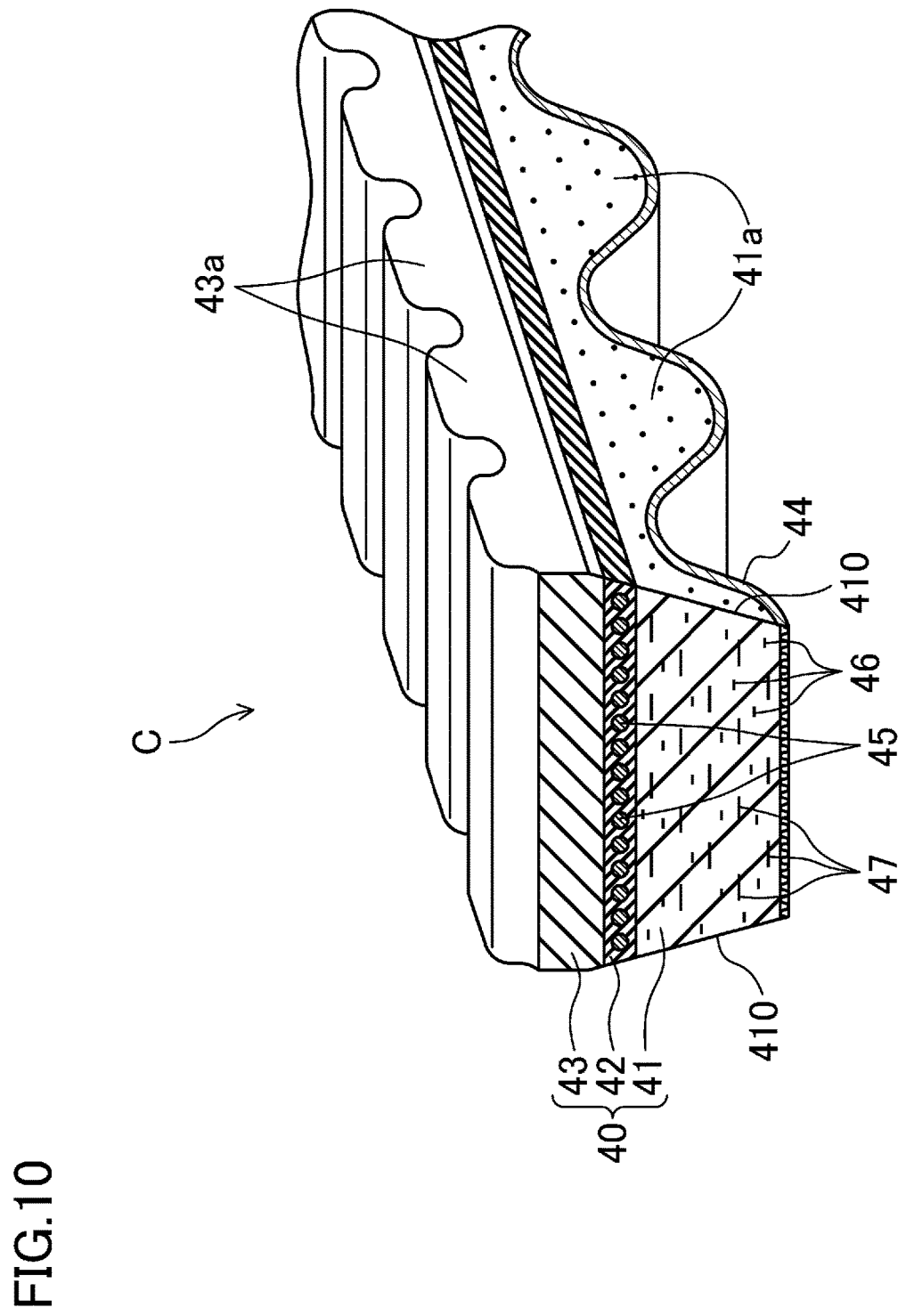
FIG. 10 is a perspective view illustrating a portion cut out from a double-cogged V-belt according to a second embodiment.
Figure 11:
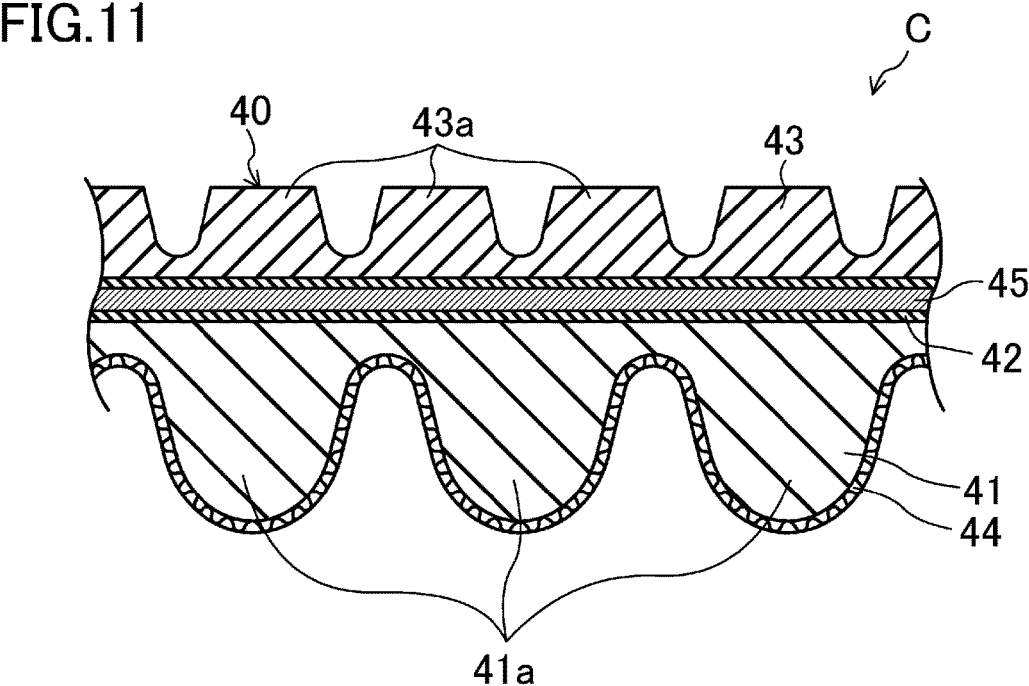
FIG. 11 is a longitudinal sectional view illustrating a portion of the double-cogged V-belt according to the second embodiment.
Figure 12:
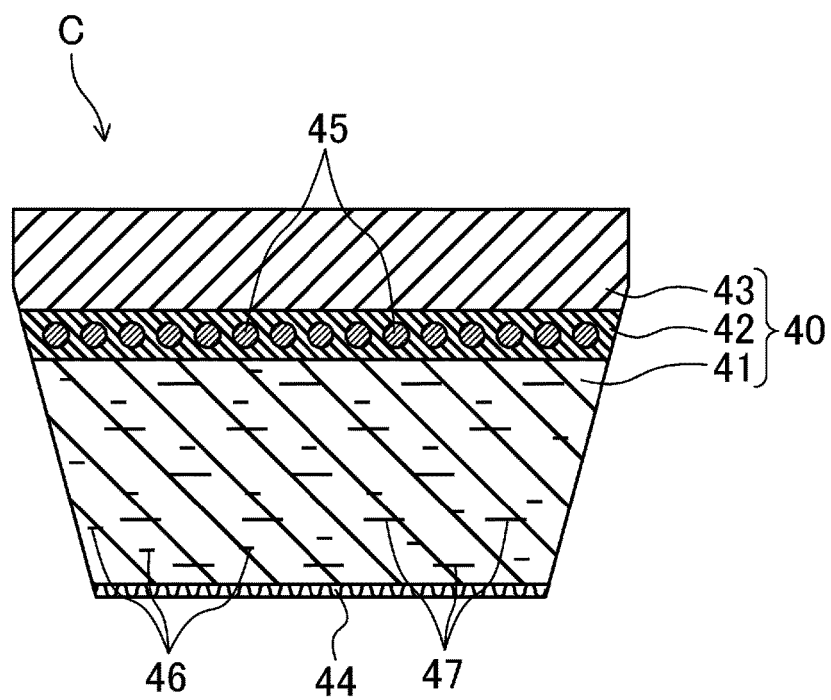
FIG. 12 is a cross-sectional view of the double-cogged V-belt according to the second embodiment.

FIGS. 10 to 12 illustrate a double-cogged V-ribbed belt C (V-belt) according to a second embodiment. The double-cogged V-belt C according to the second embodiment is used for transmissions for small vehicles such as a two-wheel motor scooter, a buggy car, and a snowmobile. The double-cogged V-belt C according to the second embodiment has a top portion with its cross section shaped in a quadrilateral along the belt width and a bottom portion with its cross section shaped in a trapezoid having a lower base shorter than an upper base. For example, the double-cogged V-belt C has a length ranging from 700 mm to 1,000 mm, a belt width to the outer circumference of the belt ranging from 10 mm to 36 mm, and a belt thickness ranging from 13 mm to 16 mm, and a V-angle in the cross section ranging from 27° to 33°.

The double-cogged V-belt C according to the second embodiment includes a double-cogged V-belt body 40. The double-cogged V-belt body 40 includes a compressed rubber layer 41 provided to the belt inner circumference, an adhesive rubber layer 42 provided to the belt outer circumference, and an extension rubber layer 43 provided closer to the belt outer circumference than the adhesive rubber layer 42. The compressed rubber layer 41, the adhesive rubber layer 42, and the extension rubber layer 43 are stacked one another to be integrated into one. A bottom face reinforcing fabric 44 is stacked on and bonded with a face to the belt inner circumferential surface of the compressed rubber layer 41 to cover the face. Furthermore, a cord 45 is embedded in the middle of the adhesive rubber layer 42 in the belt thickness direction. The cord 45 is helical with a pitch along the belt width.

Both side faces of the compressed rubber layer 41 are V-shaped side faces 410 each acting as a pulley contact surface. The compressed rubber layer 41 has a thickness ranging from 8 mm to 10 mm, for example.

The compressed rubber layer 41 is provided with lower cogs 41a at a constant pitch along the belt length. Each of the lower cogs 41a is formed so that its longitudinal section has an outline shaped in an approximate sinusoidal waveform. The lower cog 41a has a pitch ranging from 8 mm to 10 mm, for example. The lower cog 41a has a height in a belt thickness direction ranging from 6 mm to 8 mm, for example. The height is a distance from a groove bottom between the lower cogs 41a to a top portion of the lower cog 41a.

Similar to the compressed rubber layer 11 of the V-ribbed belt B according to the first embodiment, the compressed rubber layer 41 is formed of a rubber composition including nanofibers 46 and organic short fibers 47 oriented along the belt width. If the double-cogged V-belt C is used for transmitting high load in, for example, a transmission of a two-wheel motor scooter having an engine with a large displacement, it is more desirable to have higher elasticity of the compressed rubber layer 41 along the belt width. Hence, beneficially, the rubber composition forming the compressed rubber layer 41 includes para-aramid short fibers as the organic short fibers 47. A portion of the organic short fibers 47 exposed to the V-shaped side faces 410 may include the organic short fibers 47 protruding from the V-shaped side faces 410. Alternatively, the exposed organic short fibers 47 do not have to include the protruding organic short fibers 47.

Note that the rubber composition forming the compressed rubber layer 41 beneficially has characteristics below from the following viewpoint: commonly, compared with the V-ribbed belt B according to the first embodiment, the double-cogged V-belt C according to the second embodiment is used with the V-shaped side faces 410 of the compressed rubber layer 41 receiving high lateral pressure.

Hardness of the rubber composition forming the compressed rubber layer 41 is measured with a type A durometer based on JIS K6253. The hardness is beneficially 88° or higher, and more beneficially 90° or higher. Furthermore, the hardness is beneficially 100° or lower, and more beneficially 98° or lower.

In the rubber composition forming the compressed rubber layer 14, a tensile stress ($M_{10}$) measured based on JIS K6251 at 10% elongation along the belt width—a grain direction in an orientation of the nanofibers 16 and the organic short fibers 17—is beneficially 5 MPa or greater, and more beneficially 10 MPa or greater. Furthermore, the tensile stress ($M_{10}$) is beneficially 70 MPa or smaller, and more beneficially 50 MPa or smaller.

The tensile strength ($T_B$), measured based on JIS K6251 for the rubber composition forming the compressed rubber layer 41 and applied in the grain direction along the belt width, is beneficially 10 MPa or greater, and more beneficially 15 MPa or greater. Furthermore, the tensile strength ($T_B$) is beneficially 80 MPa or smaller, and more beneficially 60 MPa or smaller.

The elongation at break ($E_B$), measured based on JIS K6251 for the rubber composition forming the compressed rubber layer 41 and observed in the grain direction along the belt width, is beneficially 10% or greater, and more beneficially 15% or greater. Furthermore, the elongation at break ($E_B$) is beneficially 100% or smaller, and more beneficially 80% or smaller.

In the rubber composition forming the compressed rubber layer 41, the tensile stress ($M_{10}$) measured based on JIS K6251 at 10% elongation along the belt length—a cross-grain direction perpendicular to the orientation of the nanofibers 16 and the organic short fibers 17—is beneficially 0.5 MPa or greater, and more beneficially 1 MPa or greater. Furthermore, the tensile stress ($M_{10}$) is beneficially 10 MPa or smaller, and more beneficially 8 MPa or smaller.

In the rubber composition forming the compressed rubber layer 41, the tensile stress ($M_{50}$) measured based on JIS K6251 at 50% elongation along the belt length—the cross-grain direction—is beneficially 2 MPa or greater, and more beneficially 3 MPa or greater. Furthermore, the tensile stress ($M_{50}$) is beneficially 20 MPa or smaller, and more beneficially 18 MPa or smaller.

In the rubber composition forming the compressed rubber layer 41, the tensile strength ($T_B$), measured based on JIS K6251 and applied in the cross-grain direction along the belt length, is beneficially 5 MPa or greater, and more beneficially 7 MPa or greater. Furthermore, the tensile strength ($T_B$) is beneficially 30 MPa or smaller, and more beneficially 20 MPa or smaller.

In the rubber composition forming the compressed rubber layer 41, the elongation at break ($E_B$), measured based on JIS K6251 and observed in the cross-grain direction along the belt length, is beneficially 50% or greater, and more beneficially 60% or greater. Furthermore, the elongation at break ($E_B$) is beneficially 200% or smaller, and more beneficially 180% or smaller.

In the rubber composition forming the compressed rubber layer 41, the ratio of the tensile stress ($M_{10}$) at 10% elongation in the grain direction along the belt width to the tensile stress ($M_{10}$) at 10% elongation in the cross-grain direction along the belt length is beneficially 3 or greater, and more beneficially 5 or greater. Furthermore, the ratio is beneficially 20 or smaller, and more beneficially 18 or smaller.

In the rubber composition forming the compressed rubber layer 41, the storage modulus (E'), measured based on JIS K6394 and observed in the grain direction along the belt width, is beneficially 150 MPa or greater, and more beneficially 200 MPa or greater. Furthermore, the storage modulus (E') is beneficially 2,000 MPa or smaller, and more beneficially 1,800 MPa or smaller. The storage modulus (E') in the grain direction is measured with the rubber composition stretched at the mean strain that is a strain under a load 1.3 times greater than the load at a strain of 1%, a strain amplitude of 0.1%, a frequency of 10 Hz, and a test temperature of 100° C.

In the rubber composition forming the compressed rubber layer 41, the loss factor (tan δ), measured based on JIS K6394 and observed in the grain direction along the belt width, is beneficially 0.02 or greater, and more beneficially 0.04 or greater. Furthermore, the loss factor (tan δ) is beneficially 0.20 or smaller, and more beneficially 0.18 or smaller. The loss factor (tan δ) in the grain direction is measured with the rubber composition stretched at the mean strain that is a strain under a load 1.3 times greater than the load at a strain of 1%, a strain amplitude of 0.1%, a frequency of 10 Hz, and a test temperature of 100° C.

In the rubber composition forming the compressed rubber layer 41, the storage modulus (E'), measured based on JIS K6394 and observed in the cross-grain direction along the belt length, is beneficially 10 MPa or greater, and more beneficially 15 MPa or greater. Furthermore, the storage modulus (E') is beneficially 70 MPa or smaller, and more beneficially 50 MPa or smaller. The storage modulus (E') in the cross-grain direction is measured with the rubber composition stretched where a mean strain is 5%, a strain amplitude is 1%, a frequency is 10 Hz, and a test temperature is 100° C.

In the rubber composition forming the compressed rubber layer 41, the loss factor (tan δ), measured based on JIS K6394 and observed in the cross-grain direction along the belt length, is beneficially 0.03 or greater, and more beneficially 0.05 or greater. Furthermore, the loss factor (tan δ) is beneficially 0.30 or smaller, and more beneficially 0.25 or smaller. This loss factor (tan δ) in the cross-grain direction is also measured with the rubber composition stretched where a mean strain is 5%, a strain amplitude is 1%, a frequency is 10 Hz, and a test temperature is 100° C.

In the rubber composition forming the compressed rubber layer 41, the ratio of the storage modulus (E') in the grain direction along the belt width to the storage modulus (E') in the cross-grain direction along the belt length is beneficially 5 or greater, and more beneficially 7 or greater. The ratio is beneficially 20 or smaller, and more beneficially 18 or smaller.

The adhesive rubber layer 42 has a thickness ranging from 1.5 mm to 3.0 mm, for example. The adhesive rubber layer 42 is formed of a rubber composition. The rubber composition is made of an uncrosslinked rubber composition including a rubber component mixed with various kinds of rubber compounding ingredients. The uncrosslinked rubber composition is then heated and pressurized, the rubber component is crosslinked by a crosslinker, and, as a result, the rubber composition is produced. The rubber composition forming the adhesive rubber layer 42 may include short fibers and pulped fibers and/or reinforcement filler and co-crosslinker to achieve higher elasticity. The adhesive rubber layer 42 may be formed of the same rubber composition as that forming the adhesive rubber layer 12 of the V-ribbed belt B according to the first embodiment. Alternatively, the adhesive rubber layer 42 may be formed of the same rubber composition as that forming the compressed rubber layer 41.

The extension rubber layer 43 has a thickness ranging from 3 mm to 5 mm, for example. The extension rubber layer 43 is provided with upper cogs 43a at a constant pitch along the belt length. Each of the upper cogs 43a is formed so that its longitudinal section has an outline shaped in an approximate trapezoid. The upper cog 43a has a pitch ranging from 7 mm to 9 mm, for example. Beneficially, the pitch of the upper cogs 43a is shorter than that of the lower cogs 41a. The upper cogs 43a have a height ranging from 3 mm to 4 mm, for example. The height is a distance from a groove bottom between the upper cogs 43a to a top portion of the upper cog 43a.

The extension rubber layer 43 is formed of a rubber composition. The rubber composition is made of an uncrosslinked rubber composition including a rubber component mixed with various kinds of rubber compounding ingredients. The uncrosslinked rubber composition is then heated and pressurized, the rubber component is crosslinked by a crosslinker, and, as a result, the rubber composition is produced. The extension rubber layer 43 may be formed of the same rubber composition as that forming the compressed rubber layer 41.

The bottom face reinforcing fabric 44 comprises, for example, a fabric material 44' such as a woven fabric, a knit fabric, and a non-woven fabric which are made of yarns including cotton, polyamide fibers, PET fibers, para-aramid fibers, and meta-aramid fibers. Beneficially, the bottom face reinforcing fabric 44 includes a woven fabric of which warp and weft yarns, made of cotton and PET fibers, form a wide angle of 100° or wider, and a woven fabric made of elastic nylon fibers. The bottom face reinforcing fabric 44 receives an adhesion treatment to have a property adhesive to the double-cogged V-belt body 40. The adhesion treatment includes, before forming processing, immersing the bottom face reinforcing fabric 44 in an RFL aqueous solution and heating the immersed fabric. An alternative adhesion treatment, which can be provided alone or together with the former adhesion treatment, includes immersing the bottom face reinforcing fabric 44 in rubber cement, and drying the immersed fabric. The bottom face reinforcing fabric 44 has a thickness ranging from 0.5 mm to 3 mm, for example. Note that a reinforcing fabric, having a similar configuration as that of the bottom face reinforcing fabric 44, may be stacked on and bonded with a belt outer circumferential surface of the extension rubber layer 43 to cover the belt outer circumference face.

The cord 45 includes a wire including a twisted yarn and a braid. The twisted yarn and the braid include PET fibers, PEN fibers, para-aramid fibers, and vinylon fibers. The cord 45 beneficially includes para-aramid fibers having low elasticity if used for a transmission, for example. The cord 45 receives an adhesion treatment to have a property adhesive to the double-cogged V-belt body 40. The adhesion treatment includes, before forming processing, immersing the cord 45 in an RFL aqueous solution and heating the immersed cord. An alternative adhesion treatment, which can be provided alone or together with the former adhesion treatment, includes immersing the cord 45 in rubber cement, and drying the immersed cord. Note that, before the adhesion treatment with the RFL aqueous solution and/or the rubber cement, the cord 45 may receive another adhesion treatment as needed. The adhesion treatment includes immersing the cord 45 in an adhesive solution including an epoxy resin solution and a polyisocyanate resin solution, and heating the immersed cord. The cord 45 has an outer diameter ranging from 0.1 mm to 2 mm. Moreover, the cord 45 is beneficially embedded in double-cogged V-belt C such that the thickness between the cord 45 and the groove bottom between the lower cogs 41a ranges from 2 mm to 5 mm.

The double-cogged V-belt C according to the second embodiment as described above comprises a rubber composition, forming the compressed rubber layer 41 having the V-shaped side faces 410, which includes the nanofibers 46 and the organic short fibers 47 oriented along the belt width. Out of these fibers, the nanofibers 46 provide the rubber composition, which forms the compressed rubber layer 41 with little content, with higher elasticity along the belt width and fewer effects to a physical property along the belt length. Resulting from these features, the anisotropy of the rubber composition forming the compressed rubber layer 41 is high because the ratio of the storage modulus in the grain direction along the belt width to the storage modulus in the cross-grain direction along the belt length is 5 or higher. As a result, the double-cogged V-belt C achieves an excellent flex fatigue resistance because of its high elasticity along the belt width, and comparatively not-so-high elasticity along the belt length. Moreover, since the rubber composition forming the compressed rubber layer 41 achieves high anisotropy, the double-cogged V-belt C causes little energy loss by bending, and as a result, successfully transmits power at high efficiency. Furthermore, the organic short fibers 47 are exposed to the V-shaped side faces 410. Such a feature may reduce the friction coefficient of the V-shaped side faces 410, contributing to less abnormal noise caused by the friction between the V-shaped side faces 410 and a pulley. Concurrently, the double-cogged V-belt C may smoothly exit the pulley when leaving the pulley.

Figure 13A:
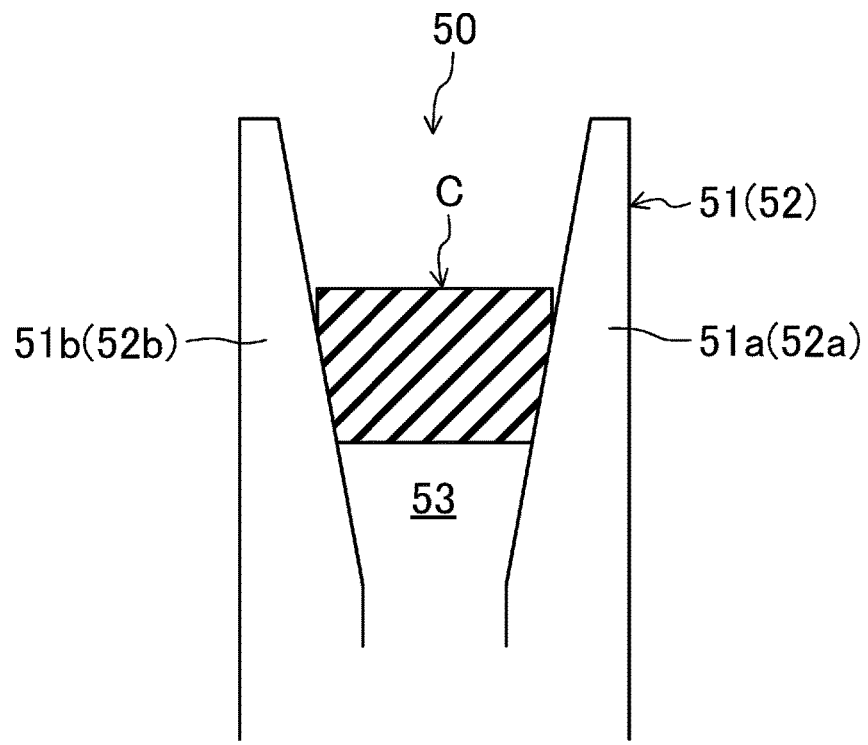
FIGS. 13A and 13B illustrate a configuration of a transmission using the double-cogged V-belt according to the second embodiment.
Figure 13B:
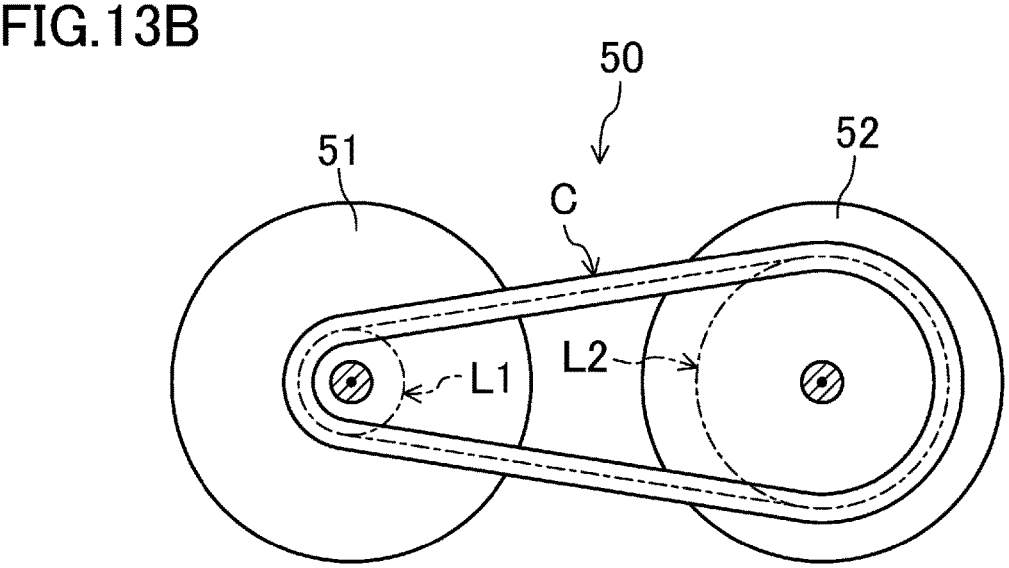

FIGS. 13A and 13B illustrate a transmission 50, for vehicles such as a motor cycle, using the double-cogged V-belt C according to the second embodiment.

This transmission 50 includes a driver pulley 51, a driven pulley 52, and a double-cogged V-belt C. The driver pulley 51 and the driven pulley 52 are arranged so that rotation axes of the pulleys 51 and 52 are arranged in parallel with each other. The double-cogged V-belt C is looped over the driver pulley 51 and the driven pulley 52.

The driver pulley 51 has a stationary sheave 51a and a movable sheave 51b. The driven pulley 52 has a stationary sheave 52a and a movable sheave 52b. The stationary sheaves 51a and 52a are axially immobile, and the movable sheaves 51b and 52b are axially movable. A V-shaped groove 53 is formed between (i) the stationary sheaves 51a and 52a and (ii) the movable sheaves 51b and 52b. When the movable sheaves 51b and 52b move closer to the stationary sheaves 51a and 52a, pulley diameters (diameters of pulley pitch lines L1 and L2) of the driver pulley 51 and the driven pulley 52 become larger. Meanwhile, when the movable sheaves 51b and 52b move away from the stationary sheaves 51a and 52a, the pulley diameters become smaller. Hence, the pulley diameters of the driver pulley 51 and the driven pulley 52 are variable. Then, the double-cogged V-belt C is looped over to fit to the V-shaped grooves 53 for the driver pulley 51 and the driven pulley 52. Note that, beneficially, a V-angle of each V-shaped groove 53 is slightly narrower than that of the double-cogged V-belt C.

In the above mechanism, this transmission 50 is configured to vary the ratio of the pulley diameter for each of the driver pulley 51 and the driven pulley 52, to change a rotation speed of the driver pulley 51 via the double-cogged V-belt C and transmit power to the driven pulley 52.

Described next is an example of how to produce the double-cogged V-belt C according to the second embodiment, with reference to FIGS. 14 to 18.

—Member Preparation Step—

Similar to the first embodiment, a member preparation step includes the following: kneading a rubber component with a composite material with a matrix-domain structure, including a matrix having thermoplastic resin and many domains formed of a bundle of the nanofibers 46—organic nanofibers—having a fiber diameter ranging from 300 μm to 1,000 nm, at a temperature higher than or equal to the melting point or the softening temperature of the thermoplastic resin in the composite material, and additionally kneading together with the organic short fibers 47 having a fiber diameter of 10 μm or larger, for preparing a kneaded body of an uncrosslinked rubber composition including the rubber component in which the nanofibers 46 and the organic short fibers 47 are dispersed (a knead body preparing step); and rolling the prepared kneaded body of the uncrosslinked rubber composition to produce an uncrosslinked rubber composition sheet to be used for forming the compressed rubber layer 41 having the V-shaped side face 410 (a rolling step).

Similarly, the member preparation step includes producing an uncrosslinked rubber composition sheet for forming the adhesive rubber layer 42, and, additionally, another uncrosslinked rubber composition sheet for preparing the extension rubber layer 43. The member preparation step further includes providing a fabric material to be the bottom face reinforcing fabric 44 and a wire 45' to be the cord 45 with respective predetermined adhesion treatments.

—Forming and Crosslinking Step—

Figure 14A:
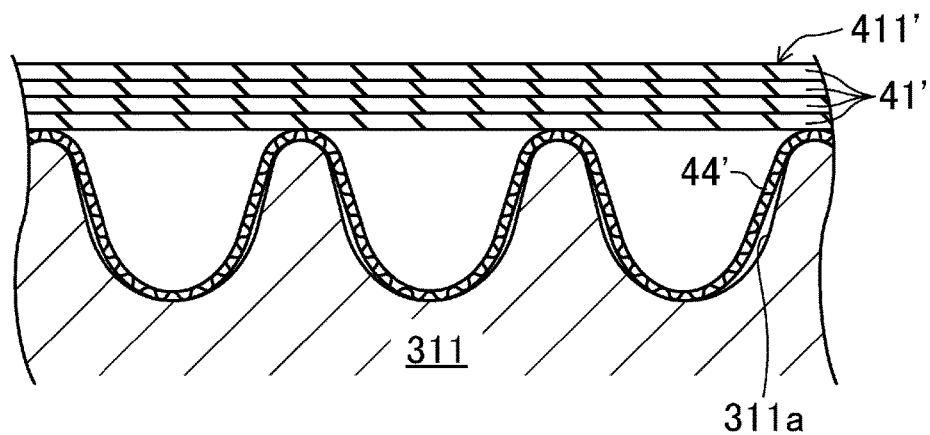
FIGS. 14A and 14B are first illustrations showing how to produce the double-cogged V-belt according to the second embodiment.

First, in a forming and crosslinking step as illustrated in FIG. 14A, the fabric material 44' to be the bottom face reinforcing fabric 44, and an uncrosslinked rubber composition sheet 41' for forming the compressed rubber layer 41 are wrapped and stacked one another in the stated order over an outer circumferential surface of a first cylindrical mold 311 to form a lower cog product 411'. The first cylindrical mold 311 has lower-cog forming grooves 311a formed to axially extend on the outer circumference of the first cylindrical mold 311, and circumferentially and consecutively arranged. Here, beneficially, the fabric material 44' is provided to conform to the outer circumferential surface of the first cylindrical mold 311 on which the lower-cog forming grooves 311a are formed. Moreover, the uncrosslinked rubber composition sheet 41' for forming the compressed rubber layer 41 is provided so that the grain direction of the uncrosslinked rubber composition sheet 41' is oriented in the axial direction of cylindrical mold 311; that is, along the belt width.

Figure 14B:
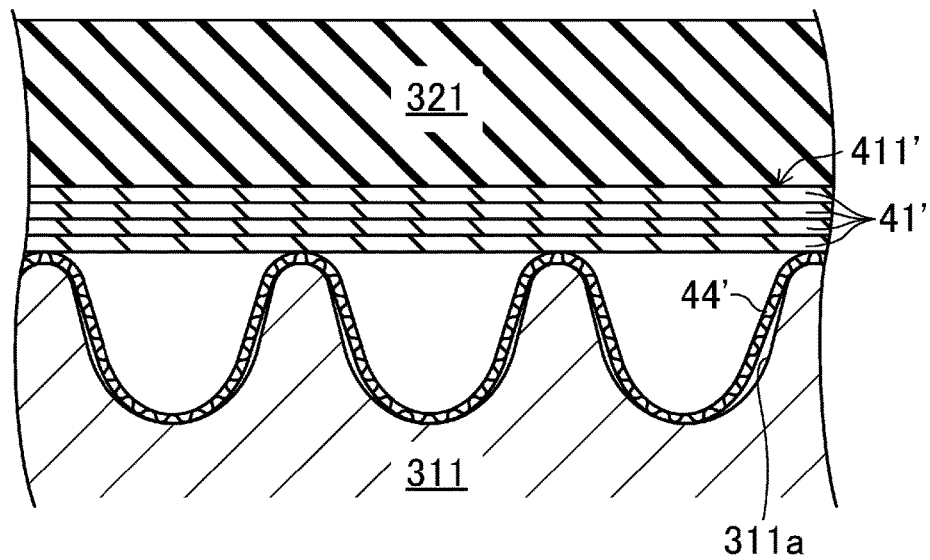
Figure 15A:
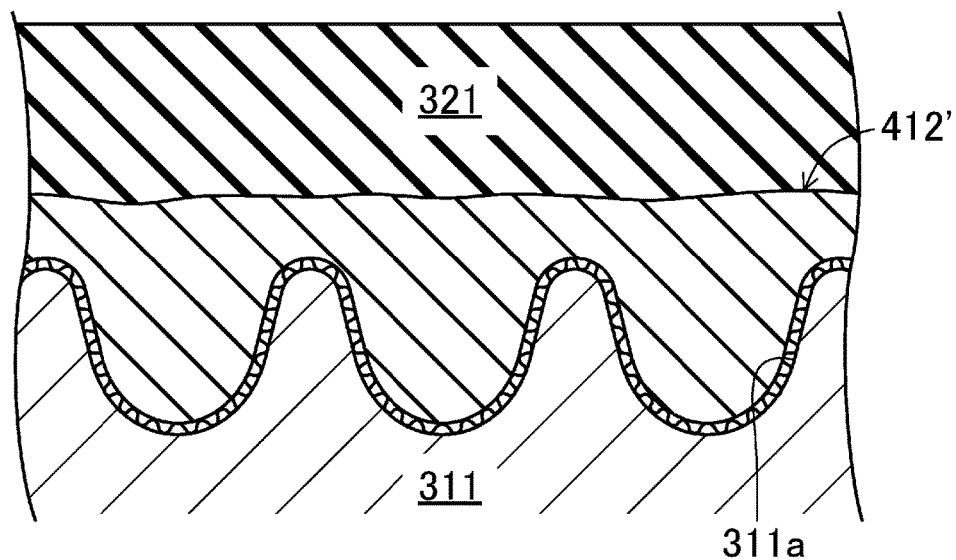
FIGS. 15A and 15B are second illustrations showing how to produce the double-cogged V-belt according to the second embodiment.

Next, as illustrated in FIG. 14B, the lower cog product 411' on the first cylindrical mold 311 is covered with a first rubber sleeve 321 having a smooth inner circumferential surface, and disposed in a vulcanizer. The vulcanizer is then hermetically sealed, filled with high-temperature and high-pressure steam, and left in this condition for a predetermined time period. Here, the uncrosslinked rubber composition sheet 41' flows to be press-fitted into the lower-cog forming grooves 311a, continuously crosslinks by approximately 50%, and combines with the fabric material 44'. Hence, as illustrated in FIG. 15A, a lower-cog composite body 412' is molded in a cylindrical shape with lower cogs provided to the inner circumference thereof. For example, the lower-cog composite body 412' has a molding temperature ranging from 100° C. to 120° C., a molding pressure ranging from 0.5 MPa to 2.0 MPa, and a molding time period ranging from 5 minutes to 15 minutes.

Figure 15B:
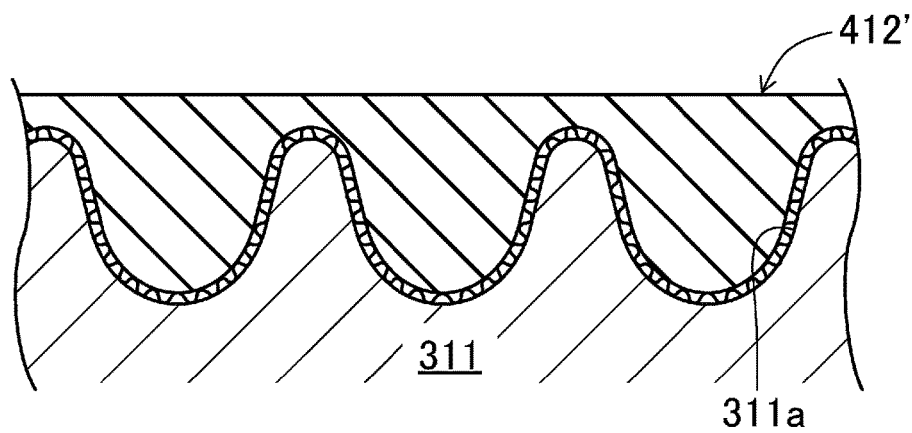

Next, the steam in the vulcanizer is released and the vulcanizer is unsealed. After that, the first cylindrical mold 311 is taken out of the vulcanizer, and the first rubber sleeve 321 is removed and cooled. Then, as illustrated in FIG. 15B, a back surface portion of the lower-cog composite body 412' molded on the first cylindrical mold 311 is shaved with a blade so that the thickness of the lower-cog composite body 412' is adjusted.

Figure 16A:
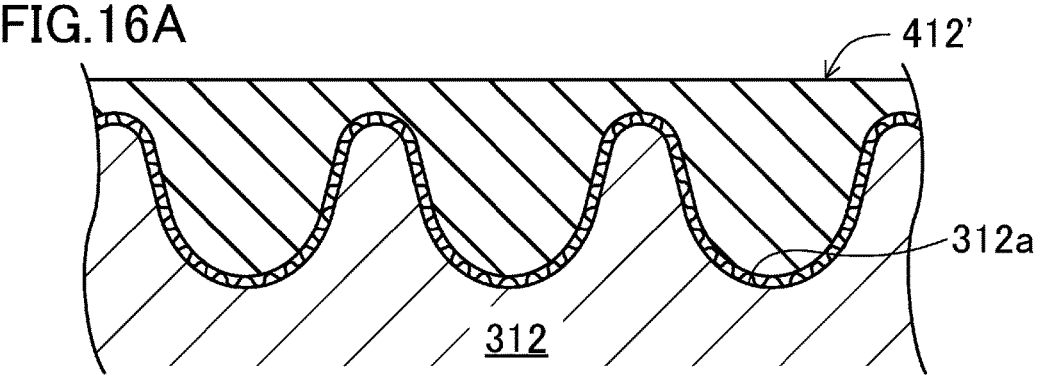
FIGS. 16A to 16C are third illustrations showing how to produce the double-cogged V-belt according to the second embodiment.

Next, the lower-cog composite body 412' is demolded from the first cylindrical mold 311. After that, similar to the first cylindrical mold 311, the demolded lower-cog composite body 412' is fitted onto a second cylindrical mold 312 as illustrated in FIG. 16A. The second cylindrical mold 312 has lower-cog fitting grooves 312a formed to axially extend on an outer circumference of the second cylindrical mold 312, and circumferentially and consecutively arranged. Here, the lower-cog composite body 412' is provided such that the lower cogs to the inner circumference of the lower-cog composite body 412' fit into the lower-cog fitting grooves 312*a* of the second cylindrical mold 312.

Figure 16B:
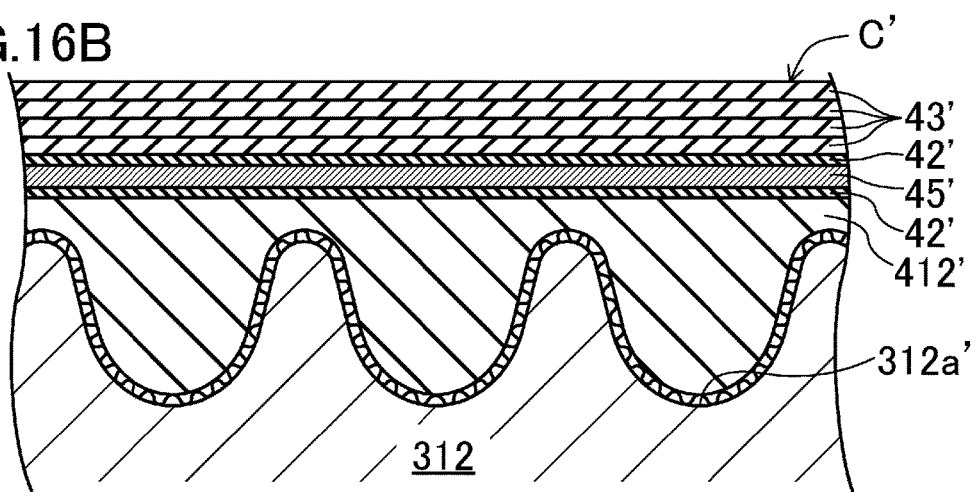

Then, as illustrated in FIG. 16B, an uncrosslinked rubber composition sheet 42', for forming the adhesive rubber layer 42, is wrapped and stacked over the lower-cog composite body 412' on the second cylindrical mold 312. Then, a wire 45' to be the cord 45 is helically wound on the uncrosslinked rubber composition sheet 42' with respect to the second cylindrical mold 312. Furthermore, on the wire 45', another uncrosslinked rubber composition sheet 42' for forming the adhesive rubber layer 42 and an uncrosslinked rubber composition sheet 43' for forming the extension rubber layer 43 are wrapped and stacked one another in the stated order. Then, a belt product C' is formed. Here, if the uncrosslinked rubber composition sheets 42' and 43', for forming the adhesive rubber layer 42 and/or the extension rubber layer 43, include the nanofibers 46 and the organic short fibers 47, as the compressed rubber layer 41 does so, the uncrosslinked rubber composition sheets 42' and 43' are provided so that the grain direction thereof is oriented in the axial direction of the second cylindrical mold 312; that is, along the belt width.

Figure 16C:
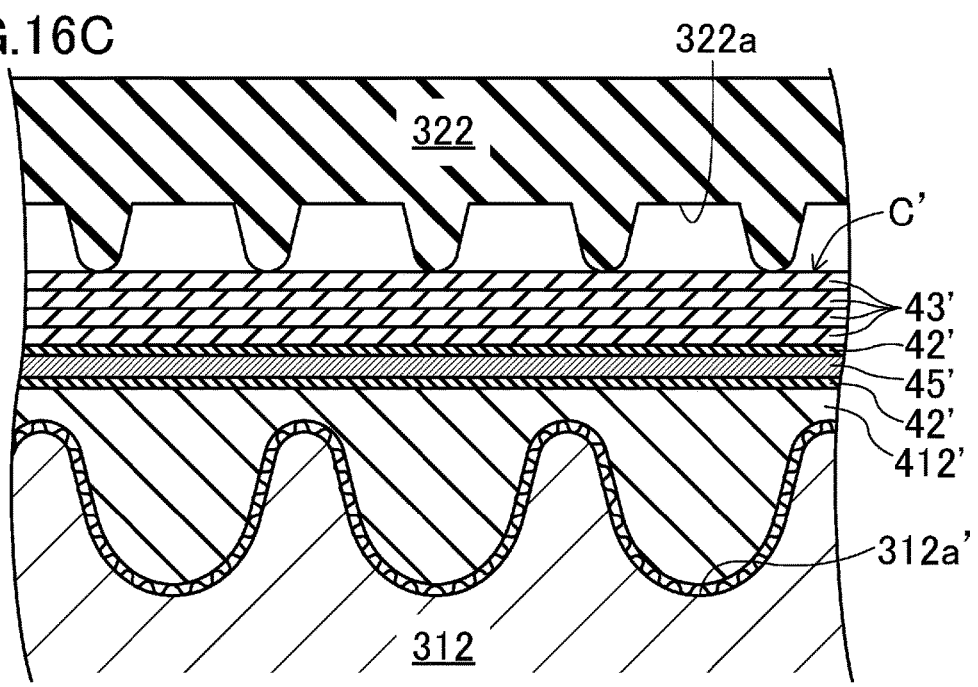
Figure 17:
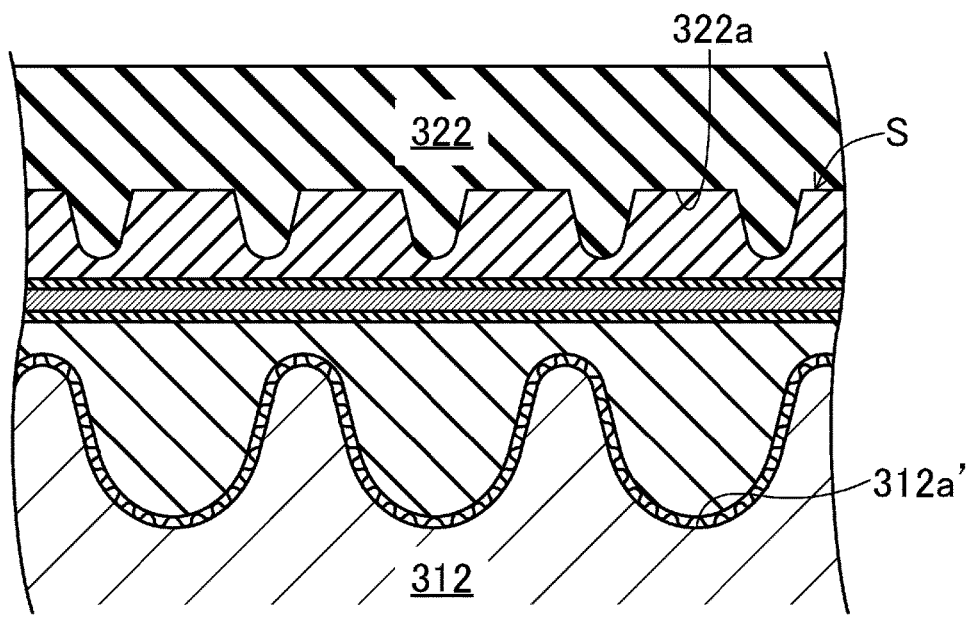
FIG. 17 is a fourth illustration showing how to produce the double-cogged V-belt according to the second embodiment.

Next, as illustrated in FIG. 16C, the belt product C' is covered with a second rubber sleeve 322, and disposed in a vulcanizer. Here, the second rubber sleeve 322 has upper-cog forming grooves 322*a* formed to axially extend on the inner circumference of the second rubber sleeve 322, and circumferentially and consecutively arranged. The vulcanizer is then hermetically sealed, charged with high-temperature and high-pressure steam, and left in this condition for a predetermined time period. Here, when a main cross-link of the lower-cog composite body 412' continues, the uncrosslinked rubber composition sheet 42' for forming the adhesive rubber layer 42 concurrently crosslinks progressively, and combines with the wire 45'. Furthermore, the uncrosslinked rubber composition sheet 43' for forming the extension rubber layer 43 flows to be press-fitted into the upper-cog forming grooves 322*a*, concurrently crosslinks progressively, and combines into one piece. Hence, as illustrated in FIG. 17, the belt slab S is finally molded in a cylindrical shape. For example, the belt slab S has a molding temperature ranging from 160° C. to 180° C., a molding pressure ranging from 0.5 MPa to 2.0 MPa, and a molding time period ranging from 10 minutes to 60 minutes.

—Grinding and Finishing Step—

The steam in the vulcanizer is released and the vulcanizer is unsealed. After that, the second cylindrical mold 312 is taken out of the vulcanizer, the second rubber sleeve 322 is removed and cooled, and the belt slab S is demolded from the second cylindrical mold 312.

Figure 18A:
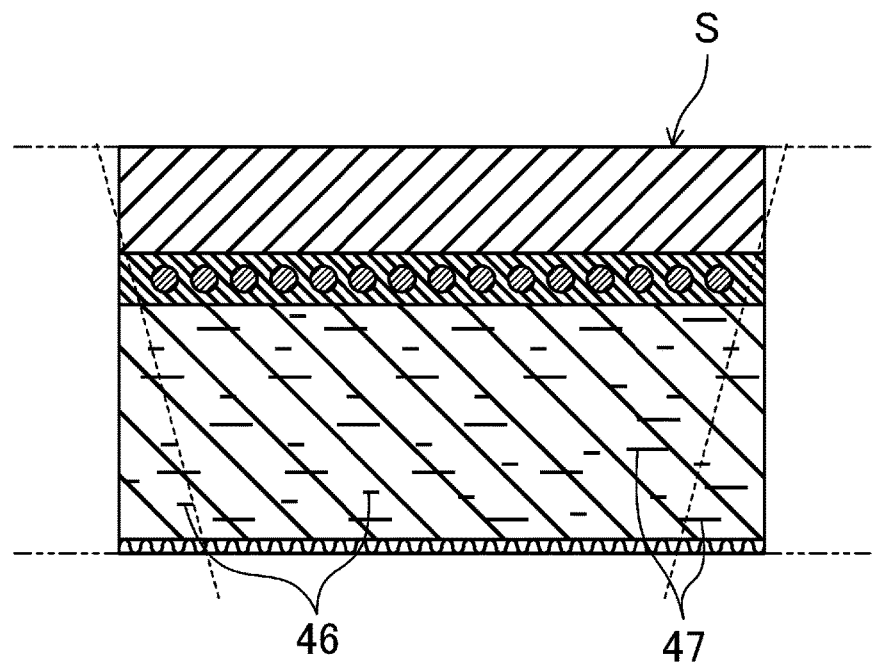
FIGS. 18A and 18B are fifth illustrations showing how to produce the double-cogged V-belt according to the second embodiment.
Figure 18B:
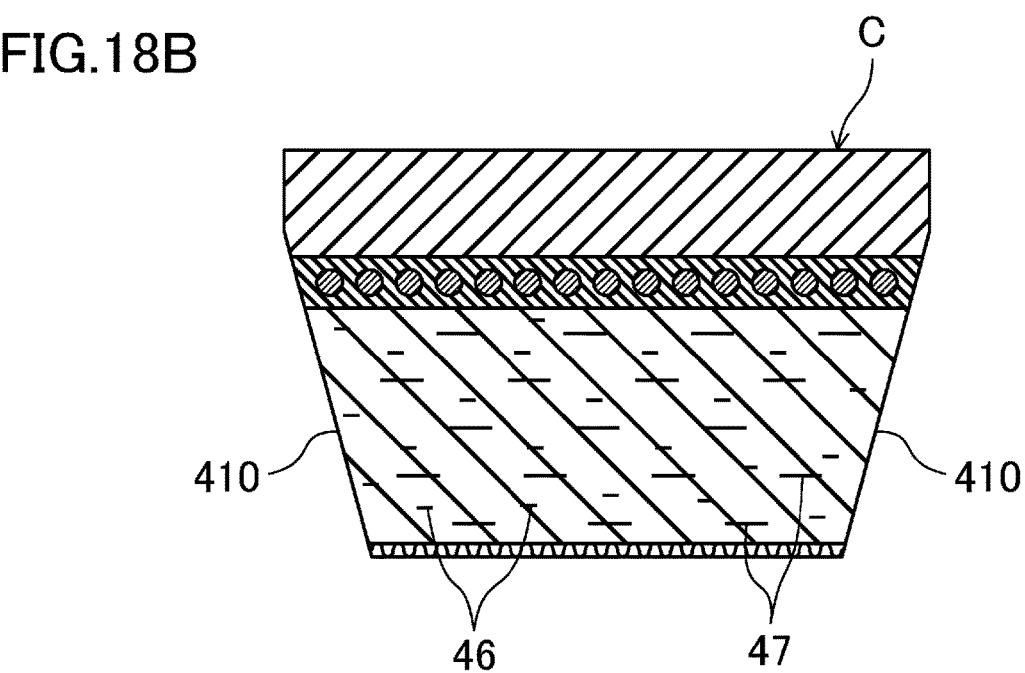

Next, as illustrated in FIG. 18A, the belt slab S is sliced in a predetermined width. Then, as illustrated in FIG. 18B, both of its side faces are skived and the V-shaped side faces 410 are formed. Moreover, a surface of each V-shaped side face 410 is grinded and smoothed. As a result, the double-cogged belt C according to second embodiment is obtained.

(Other Embodiments)

Figure 19:
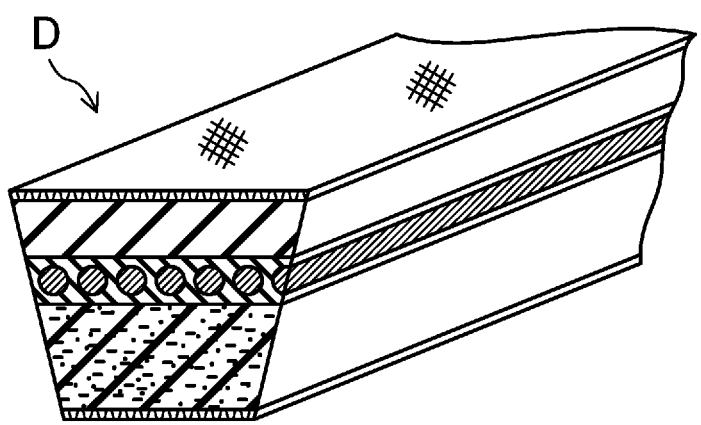
FIG. 19 is a perspective view illustrating a portion cut out from a low-edge V-belt according to another embodiment.

The first embodiment describes the V-ribbed belt B, and the second embodiment describes the double-cogged V-belt C. However, the embodiments shall not be limited to these belts. Instead, obtained in the embodiments may be a typical low-edge V-belt D as illustrated in FIG. 19.

EXAMPLES

[Test and Evaluation 1]
(Rubber Composition)

Rubber compositions were produced in Examples 1 to 5, and Comparative Examples 1 to 5 and Reference Example as described below. Table 1 also shows details of the rubber compositions.

Example 1

EPDM (EPDM manufactured by Dow Chemical Company and the trade name of Nordel IP 4640), to be used as a rubber component, was put into a Banbury mixer. For 100 parts by mass of this rubber component, the following ingredients were put into the Banbury mixer and kneaded together with the rubber component: 65 parts by mass of carbon black (FEF manufactured by Tokai Carbon Co., Ltd. and the trade name of SEAST SO); 10 parts by mass of process oil (manufactured by Japan Sun Oil Co., Ltd. and the trade name of SUMPAR 2280); 1 part by mass of stearic acid (manufactured by New Japan Chemical Co., Ltd. and the trade name of stearic acid 50S) as a processing aid; 5 parts by mass of zinc oxide (manufactured by Sakai Chemical Industry Co., Ltd. and the trade name of Zinc Oxide No. 3) as a vulcanization accelerating aid; and 2 parts by mass of antioxidant (manufactured by Ouchi Shinko Chemical Industrial Co., Ltd. and the trade name of NOCRAC MB). Then, 7.1 parts by mass of a composite material A (a composite material manufactured by Teijin Ltd. and including polyethylene resin and PET nanofibers) was added for 100 parts by mass of the rubber component, and the rubber component was further kneaded at 135° C. which is higher than the melting point of the polyethylene resin included in the composite material A.

Next, the kneaded body of an uncrosslinked rubber composition in a solid state was taken out of the Banbury mixer, and cooled for a while. After that, the kneaded body was put into the Banbury mixer and kneaded together with the following ingredients for 100 parts by mass of the rubber component: 10 parts by mass of 6,6-nylon short fibers (manufactured by Teijin Ltd. and the trade name of CFN 3000 having a fiber diameter of 26 μm, a fiber length of 3 mm, and an aspect ratio of 115); 3 parts by mass of organic peroxide (manufactured by NOF corporation and the trade name of PERCUMYL D (dicumyl peroxide)) as a cross-linker; and 2 parts by mass of ethylene glycol dimethacrylate (manufactured by Sanshin Chemical Industry Co., Ltd. and the trade name of SAN-ESTER EG).

Then, the kneaded body of an uncrosslinked rubber composition in a solid state was taken out of the Banbury mixer and calendered by a calender, such that produced was an uncrosslinked rubber composition sheet in Example 1 with a thickness ranging from 0.6 mm to 0.7 mm.

The composite material A has a matrix-domain structure including a matrix of polyethylene resin having a melting point of 130° C. and 700 domains including a nanofiber bundle having 700 PET fibers with a fiber diameter of 840 μm. In the composite material A, the content of polyethylene resin is 30% by mass, and the content of nanofibers is 70% by mass. The composite material A has an outer diameter of 28 μm, a length of 1 mm, and an aspect ratio of 35.7. Thus, the nanofibers included in the composite material A have an aspect ratio of 1190. In the rubber composition of Example 1, the content of the polyethylene resin is 2.1 parts by mass for 100 parts by mass of the rubber component, and the content of the nanofibers is 5 parts by mass for 100 parts by mass of the rubber component.

In the rubber composition of Example 1, the nanofibers have a volume fraction of 2.01% by volume, the organic short fibers have a volume fraction of 4.74% by volume, and the sum of the volume fractions of the nanofibers and the organic short fibers is 6.75% by volume.

Example 2

An uncrosslinked rubber composition sheet was produced in Example 2. The uncrosslinked rubber composition sheets in Examples 1 and 2 were the same in configuration except that, instead of the composite material A, 7.1 parts by mass of a composite material B (a composite material manufactured by Teijin Ltd. and including polyethylene resin and PET nanofibers) was mixed for 100 parts by mass of the rubber component.

The composite material B has a matrix-domain structure including a matrix of polyethylene resin having a melting point of 130° C. and 700 domains including a nanofiber bundle having 700 PET fibers with a fiber diameter of 400 μm. In the composite material B, the content of polyethylene resin is 30% by mass, and the content of nanofibers is 70% by mass. The composite material B has an outer diameter of 14 μm, a length of 1 mm, and an aspect ratio of 71.4. Thus, the nanofibers included in the composite material B have an aspect ratio of 2500. In the rubber composition of Example 2, the content of the polyethylene resin is 2.1 parts by mass for 100 parts by mass of the rubber component, and the content of the nanofibers is 5 parts by mass for 100 parts by mass of the rubber component.

In the rubber composition of Example 2, the nanofibers have a volume fraction of 2.01% by volume, the organic short fibers have a volume fraction of 4.74% by volume, and the sum of the volume fractions of the nanofibers and the organic short fibers is 6.75% by volume.

Example 3

An uncrosslinked rubber composition sheet was produced in Example 3. The uncrosslinked rubber composition sheets in Examples 1 and 3 were the same in configuration except that, instead of 6,6-nylon short fibers, 10 parts by mass of PET short fibers (manufactured by Teijin Ltd. and the trade name of CFT 3000 having a fiber diameter of 16 μm, a fiber length of 3 mm, and an aspect ratio of 188) was mixed for 100 parts by mass of the rubber component.

In the rubber composition of Example 3, the nanofibers have a volume fraction of 2.02% by volume, the organic short fibers have a volume fraction of 4.04% by volume, and the sum of the volume fractions of the nanofibers and the organic short fibers is 6.06% by volume.

Example 4

An uncrosslinked rubber composition sheet was produced in Example 4. The uncrosslinked rubber composition sheets in Examples 2 and 4 are the same in configuration except that, instead of the 6,6-nylon short fibers, 10 parts by mass of the same PET short fibers as those used in Example 3 were mixed for 100 parts by mass of the rubber component.

In the rubber composition of Example 4, the nanofibers have a volume fraction of 2.02% by volume, the organic short fibers have a volume fraction of 4.04% by volume, and the sum of the volume fractions of the nanofibers and the organic short fibers is 6.06% by volume.

Example 5

An uncrosslinked rubber composition sheet was produced in Example 5. The uncrosslinked rubber composition sheets in Examples 1 and 5 were the same in configuration except that, instead of 6,6-nylon short fibers, 12 parts by mass of para-aramid short fibers (manufactured by Teijin Ltd. and the trade name of Technora having a fiber diameter of 12.3 μm, a fiber length of 3 mm, and an aspect ratio of 244) were mixed for 100 parts by mass of the rubber component, and the content of the composite material A was 14.3 parts by mass for 100 parts by mass of the rubber component.

In the rubber composition of Example 5, the content of the polyethylene resin is 4.3 parts by mass for 100 parts by mass of the rubber component, and the content of the nanofibers is 10 parts by mass for 100 parts by mass of the rubber component.

In the rubber composition of Example 5, the nanofibers have a volume fraction of 3.90% by volume, the organic short fibers have a volume fraction of 4.52% by volume, and the sum of the volume fractions of the nanofibers and the organic short fibers is 8.42% by volume.

Comparative Example 1

An uncrosslinked rubber composition sheet was produced in Comparative Example 1. The uncrosslinked rubber composition sheets in Example 1 and Comparative Example 1 were the same in configuration except that the composite material A was not mixed, and the content of 6,6-nylon short fibers was 25 parts by mass for 100 parts by mass of the rubber component.

In the rubber composition of Comparative Example 1, the organic short fibers have a volume fraction of 11.40% by volume.

Comparative Example 2

An uncrosslinked rubber composition sheet was produced in Comparative Example 2. The uncrosslinked rubber composition sheets in Example 3 and Comparative Example 2 were the same in configuration except that the composite material A was not mixed, and the content of PET short fibers was 25 parts by mass for 100 parts by mass of the rubber component.

In the rubber composition of Comparative Example 2, the organic short fibers have a volume fraction of 9.83% by volume.

Comparative Example 3

An uncrosslinked rubber composition sheet was produced in Comparative Example 3. The uncrosslinked rubber composition sheets in Example 1 and Comparative Example 3 were the same in configuration except that 6,6-nylon short fibers were not mixed, and the content of the composite material A was 14.3 parts by mass for 100 parts by mass of the rubber component.

In the rubber composition of Comparative Example 3, the content of the polyethylene resin is 4.3 parts by mass for 100 parts by mass of the rubber component, and the content of the nanofibers is 10 parts by mass for 100 parts by mass of the rubber component.

In the rubber composition of Comparative Example 3, the nanofibers have a volume fraction of 4.08% by volume.

Comparative Example 4

An uncrosslinked rubber composition sheet was produced in Comparative Example 4. The uncrosslinked rubber composition sheets in Example 2 and Comparative Example 4 were the same in configuration except that 6,6-nylon short fibers were not mixed, and the content of the composite material B was 14.3 parts by mass for 100 parts by mass of the rubber component.

In the rubber composition of Comparative Example 4, the content of the polyethylene resin is 4.3 parts by mass for 100 parts by mass of the rubber component, and the content of the nanofibers is 10 parts by mass for 100 parts by mass of the rubber component.

short fibers was 20 parts by mass for 100 parts by mass of the rubber component.

In the rubber composition of Comparative Example 5, the organic short fibers have a volume fraction of 7.78% by volume.

REFERENCE

An uncrosslinked rubber composition sheet was produced in Reference. This uncrosslinked rubber composition sheet was the same in configuration with those in Examples 1 to 5 and Comparative Examples 1 to 5 except that neither a composite material nor organic short fibers were mixed.

TABLE 1

|  | Example | | | | | Comparative Example | | | | | Reference |
| --- | --- | --- | --- | --- | --- | --- | --- | --- | --- | --- | --- |
|  | 1 | 2 | 3 | 4 | 5 | 1 | 2 | 3 | 4 | 5 |  |
| EPDM *1 | 100 | 100 | 100 | 100 | 100 | 100 | 100 | 100 | 100 | 100 | 100 |
| FEF Carbon Black*2 | 65 | 65 | 65 | 65 | 65 | 65 | 65 | 65 | 65 | 65 | 65 |
| Composite Material A*3 | 7.1 |  | 7.1 |  | 14.3 |  |  | 14.3 |  |  |  |
| Thermoplastic Resin | (2.1) |  | (2.1) |  | (4.3) |  |  | (4.3) |  |  |  |
| Nanofibers | (5) |  | (5) |  | (10) |  |  | (10) |  |  |  |
| Composite Material B*4 |  | 7.1 |  | 7.1 |  |  |  |  | 14.3 |  |  |
| Thermoplastic Resin |  | (2.1) |  | (2.1) |  |  |  |  | (4.3) |  |  |
| Nanofibers |  | (5) |  | (5) |  |  |  |  | (10) |  |  |
| 6,6-Nylon Short Fibers*5 | 10 | 10 |  |  |  | 25 |  |  |  |  |  |
| PET Short Fibers*6 |  |  | 10 | 10 |  |  | 25 |  |  |  |  |
| Para-Aramid Short Fibers*7 |  |  |  |  | 12 |  |  |  |  | 20 |  |
| Process Oil*8 | 10 | 10 | 10 | 10 | 10 | 10 | 10 | 10 | 10 | 10 | 10 |
| Processing Aid: Stearic Acid*9 | 1 | 1 | 1 | 1 | 1 | 1 | 1 | 1 | 1 | 1 | 1 |
| Vulcanization Accelerating Aid: Zinc Oxide*10 | 5 | 5 | 5 | 5 | 5 | 5 | 5 | 5 | 5 | 5 | 5 |
| Antioxidant*11 | 2 | 2 | 2 | 2 | 2 | 2 | 2 | 2 | 2 | 2 | 2 |
| Crosslinker: Organic Peroxide*12 | 3 | 3 | 3 | 3 | 3 | 3 | 3 | 3 | 3 | 3 | 3 |
| Co-Crosslinker*13 | 2 | 2 | 2 | 2 | 2 | 2 | 2 | 2 | 2 | 2 | 2 |
| Volume Fraction of Nanofibers (% by Volume) | 2.01 | 2.01 | 2.02 | 2.02 | 3.90 | — | — | 4.08 | 4.08 | — | — |
| Volume Fraction of Short Fibers (% by Volume) | 4.74 | 4.74 | 4.04 | 4.04 | 4.52 | 11.40 | 9.83 | — | — | 7.78 | — |
| Sum of Volume Fractions (% by Volume) | 6.75 | 6.75 | 6.06 | 6.06 | 7.42 | 11.40 | 9.83 | 4.08 | 4.08 | 7.78 | — |

*1: EPDM Nordel IP 4640 manufactured by Dow Chemical Company
*2: FEF SEAST SO manufactured by Tokai Carbon Co., Ltd.
*3: Composite Material (Material Diameter: 28 μm) manufactured by Teijin Ltd. and including Polyethylene Resin (30% by Mass) and PET Nanofibers (Fiber Diameter: 840 nm, Fiber Length: 1 mm)
*4: Composite Material (Material Diameter: 14 μm) manufactured by Teijin Ltd. and including Polyethylene Resin (30% by Mass) and PET Nanofibers (Fiber Diameter: 400 nm, Fiber Length: 1 mm)
*5: 6,6-Nylon Short Fibers manufactured by Teijin Ltd. (Fiber Diameter: 26 μm, Fiber Length: 3 mm)
*6: PET Short Fibers manufactured by Teijin Ltd. (Fiber Diameter: 16 μm, Fiber Length: 3 mm)
*7: Para-Aramid Short Fibers Technora Cut Fibers CFH3050 manufactured by Teijin Ltd. (Fiber Diameter: 12.3 μm, Fiber Length: 3 mm)
*8: SUMPAR 2280 manufactured by Japan Sun Oil Co., Ltd.
*9: Stearic Acid 50S manufactured by New Japan Chemical Co., Ltd.
*10: Zinc Oxide No. 3 manufactured by Sakai Chemical Industry Co., Ltd.
*11: NOCRAC MB manufactured by Ouchi Shinko Chemical Industrial Co., Ltd.
*12: PERCUMYL D manufactured by NOF Corporation
*13: SAN-ESTER EG manufactured by Sanshin Chemical Industry Co., Ltd.

In the rubber composition of Comparative Example 4, the nanofibers have a volume fraction of 4.08% by volume.

Comparative Example 5

An uncrosslinked rubber composition sheet was produced in Comparative Example 5. The uncrosslinked rubber composition sheets in Example 5 and Comparative Example 5 were the same in configuration except that the composite material A was not mixed, and the content of para-aramid (Methods for Tests and Evaluations)

A specimen was produced of a rubber composition, crosslinked by press forming, for each of Examples 1 to 5, Comparative Examples 1 to 5, and Reference.

<Rubber Hardness Evaluation Test>

Rubber hardness was measured based on JIS K6253 by a type A durometer.

<Tensile Property Evaluation Test>

Tensile tests were conducted for both of the grain and cross-grain directions based on JIS K6251. For the grain direction, measured were a tensile stress ($M_{10}$), a tensile strength ($T_B$), and an elongation at break ($E_B$) at 10% elongation. For the cross-grain direction, measured were a tensile stress ($M_{10}$) at 10% elongation, and a tensile stress ($M_{50}$), a tensile strength ($T_B$), and an elongation at break ($E_B$) at 50% elongation. Furthermore, obtained was a ratio of a tensile stress ($M_{10}$) at 10% elongation in the grain direction to a tensile stress ($M_{10}$) at 10% elongation in the cross-grain direction.

<Dynamic Viscoelastic Property Evaluation Test>

For the grain direction, a storage modulus (E') and a loss factor (tan δ) were measured based on the JIS K6394 with the specimen stretched at the mean strain that was a strain under a load 1.3 times greater than the load at a strain of 1%, a strain amplitude of 0.1%, a frequency of 10 Hz, and a test temperature of 100° C. For the cross-grain direction, a storage modulus (E') and a loss factor (tan δ) were measured, with the specimen stretched where a mean strain was 5%, a strain amplitude was 1%, a frequency was 10 Hz, and a test temperature was 100° C. Moreover, obtained was a ratio of the storage modulus (E') in the grain direction to the storage modulus (E') in the cross-grain direction. Note that the measurement was conducted using a viscoelasticity tester manufactured by RHEOLOGY.

<Wear Resistance Property and Friction Coefficient Evaluation Test>

A pin-on-disk type friction and abrasion tester was used. In a cubed specimen having a side of 5 mm, a face perpendicular to the grain direction was determined as a sliding face. The sliding face was abutted onto a surface of a disk-shaped abrasion material made of S45C and controlled at a temperature of 100° C., so that the sliding direction was perpendicular to the grain direction and the cross-grain direction. Concurrently, a load of 19.6N was applied to the specimen from above, the abrasion material was rotated at a speed of 80 rpm, (a slipping velocity of 15.072 m/min.), and a volume loss caused by the abrasion was measured in 24 hours. This test was conducted twice, and the average value obtained from the tests was determined as data.

Moreover, in a cubed specimen having a side of 5 mm, a face perpendicular to the grain direction was determined as a sliding face. The sliding face was abutted onto a surface of the disk-shaped abrasion material made of S45C and having a room temperature of 23° C., so that the sliding direction was perpendicular to the grain direction and the cross-grain direction. Concurrently, a load of 19.6N was applied to the specimen from above, the abrasion material was rotated at a speed of 80 rpm, (a slipping velocity of 15.072 m/min.), and the friction coefficient was measured.

<Flex-Fatigue-Resistance Evaluation Test>

Based on JIS K6260, a specimen was repeatedly flexed at a stroke of 20 mm for 300 times per minute by a De Mania flexing tester. The cross-grain direction of the specimen was determined as a length direction thereof. The number of flexing times was counted until the cubed specimen was broken. The test was conducted twice, and the average value was determined as data of the flexing times until the break.

(Results of Tests and Evaluations)

Table 2 shows the results of the tests.

TABLE 2

|  |  |  | Example | | | | | Comparative Example |
|---|---|---|---|---|---|---|---|---|
|  |  |  | 1 | 2 | 3 | 4 | 5 | 1 |
|  | Rubber Hardness (°) |  | 89 | 92 | 88 | 92 | 93 | 89 |
| Tensile Property | Grain Direction | Tensile Stress $M_{10}$ at 10% Elongation (MPa) | 7.80 | 8.00 | 7.50 | 7.90 | 28.20 | 3.50 |
|  |  | Tensile Strength $T_B$ (MPa) | 14.60 | 13.90 | 14.30 | 14.10 | 32.00 | 14.60 |
|  |  | Elongation at Break $E_B$ (%) | 190 | 195 | 180 | 195 | 30 | 232 |
|  | Cross-Grain Direction | Tensile Stress $M_{10}$ at 10% Elongation (MPa) | 1.30 | 1.40 | 1.45 | 1.40 | 2.80 | 1.35 |
|  |  | Tensile Stress $M_{10}$ at 50% Elongation (MPa) | 2.90 | 3.00 | 2.80 | 2.90 | 7.70 | 3.05 |
|  |  | Tensile Strength $T_B$ (MPa) | 11.30 | 11.20 | 11.50 | 11.10 | 12.00 | 9.65 |
|  |  | Elongation at Break $E_B$ (%) | 210 | 205 | 220 | 200 | 90 | 180 |
|  | Grain Direction $M_{10}$/Cross-Grain Direction $M_{10}$ |  | 6.00 | 5.71 | 5.17 | 5.64 | 10.07 | 2.59 |
| Dynamic Viscoelasticity Property | Grain Direction | Storage Modulus (E') (MPa) | 130 | 142 | 125 | 138 | 330 | 80 |
|  |  | Loss Factor (tanδ) | 0.062 | 0.07 | 0.064 | 0.068 | 0.061 | 0.08 |
|  | Cross-Grain Direction | Storage Modulus (E') (MPa) | 25 | 24 | 24 | 26 | 35 | 18.3 |
|  |  | Loss Factor (tanδ) | 0.151 | 0.148 | 0.149 | 0.15 | 0.148 | 0.142 |
|  | Grain Direction E'/Cross-Grain Direction E' |  | 5.20 | 5.92 | 5.21 | 5.31 | 9.43 | 4.37 |
| Wear Resistance Property, Abrasion Loss, Abrasion Volume Loss (cm³) |  |  | 0.0018 | 0.0015 | 0.0019 | 0.0020 | 0.0012 | 0.0020 |
| Friction Coefficient |  |  | 0.45 | 0.52 | 0.45 | 0.56 | 0.51 | 0.43 |
| Flex Fatigue Resistance, Number of Flexing Times until Break (Times) |  |  | 32500 | 32500 | 37500 | 32500 | 6000 | 12500 |

|  |  |  | Comparative Example | | | | Reference |
|---|---|---|---|---|---|---|---|
|  |  |  | 2 | 3 | 4 | 5 |  |
|  | Rubber Hardness (°) |  | 91 | 91 | 90 | 95 | 77 |
| Tensile Property | Grain Direction | Tensile Stress $M_{10}$ at 10% Elongation (MPa) | 4.30 | 6.25 | 6.20 | 28.00 | 0.85 |
|  |  | Tensile Strength $T_B$ (MPa) | 13.60 | 14.80 | 14.20 | 33.40 | 18.60 |
|  |  | Elongation at Break $E_B$ (%) | 215 | 205 | 195 | 25 | 303 |
|  | Cross-Grain | Tensile Stress $M_{10}$ at 10% Elongation (MPa) | 1.50 | 1.25 | 1.16 | 3.32 | 0.79 |

TABLE 2-continued

|  |  |  |  |  |  |  |  |
|---|---|---|---|---|---|---|---|
|  | Direction | Tensile Stress $M_{10}$ at 50% Elongation (MPa) | 2.80 | 3.15 | 3.00 | 8.00 | 2.20 |
|  |  | Tensile Strength $T_B$ (MPa) | 9.30 | 12.40 | 13.50 | 11.10 | 17.90 |
|  |  | Elongation at Break $E_B$ (%) | 165 | 220 | 215 | 75 | 320 |
|  |  | Grain Direction $M_{10}$/Cross-Grain Direction $M_{10}$ | 2.87 | 5.00 | 5.34 | 8.43 | 1.08 |
| Dynamic Visco-elasticity Property | Grain Direction | Storage Modulus (E') (MPa) | 130 | 130 | 120 | 336 | 21.1 |
|  |  | Loss Factor (tanδ) | 0.076 | 0.05 | 0.051 | 0.06 | 0.089 |
|  | Cross-Grain Direction | Storage Modulus (E') (MPa) | 32 | 21 | 20 | 45 | 12 |
|  |  | Loss Factor (tanδ) | 0.148 | 0.135 | 0.138 | 0.153 | 0.15 |
|  | Grain Direction E'/Cross-Grain Direction E' |  | 4.06 | 6.19 | 6.00 | 7.47 | 1.76 |
| Wear Resistance Property, Abrasion Loss, Abrasion Volume Loss (cm³) |  |  | 0.0022 | 0.0018 | 0.0016 | 0.0016 | 0.0125 |
| Friction Coefficient |  |  | 0.54 | 0.87 | 0.91 | 0.51 | 0.98 |
| Flex Fatigue Resistance, Number of Flexing Times until Break (Times) |  |  | 7500 | 42500 | 57500 | 1250 | 50000 |

According to these results, a comparison between Examples 1 to 4—the nanofibers and organic short fibers were mixed together—and Comparative Examples 1 and 2—organic short fibers alone were mixed without nanofibers—shows that the former and the latter are the same in friction coefficient; however, the former are greater in the ratio of the storage modulus (E') in the grain direction to the storage modulus (E') in the cross-grain direction than the latter. Consequently, the comparison shows that Examples 1 to 4 demonstrate higher anisotropy.

Moreover, a comparison between Examples 1 to 4—the nanofibers and organic short fibers were mixed together—and Comparative Examples 3 and 4—nanofibers alone were mixed without organic short fibers—shows that the former and the latter are the same in anisotropy and flex fatigue resistance; however, the former are lower in friction coefficient.

Furthermore, Example 5—nanofiber and para-aramid short fibers were mixed—shows relatively excellent flex fatigue resistance for its high elasticity in both of the grain and cross-grain directions, and high anisotropy. Meanwhile, Comparative Example 5—para-amid short fibers alone were mixed without nanofibers—shows high elasticity in both of the grain and cross-grain directions, and high anisotropy; however, Comparative Example 5 shows low flex fatigue resistance.

Note that when the broken faces of the specimens after the tensile tests of Examples 1 to 5 were observed with an SEM, the nanofibers were found to be dispersed without agglomerating together.

[Test and Evaluation 2]
(V-Ribbed Belt)

Using each of the rubber compositions in Examples 1 to 4 and Comparative Examples 1 to 4, V-ribbed belts including a compressed rubber layer were produced with a technique similar to the first embodiment, so that the grain direction of the rubber compositions was the belt width direction.

Note that the adhesive rubber layer was made of an EPDM rubber composition, the back surface reinforcing fabric was made of a woven fabric having a thickness of 0.7 mm and including PET fibers and/or cotton-blended canvas, and the cord was made of a twisted yarn including PET fibers and having an outer diameter of 1.1 mm. Each of the V-ribbed belts had a belt length of 1,400 mm, a belt width of 2.2 mm, and a belt thickness of 4.5 mm. The V-ribbed belt has three V-shaped ribs.

(Methods for Tests and Evaluations)
<Flex-Fatigue-Resistance Evaluation Test>

Figure 20A:
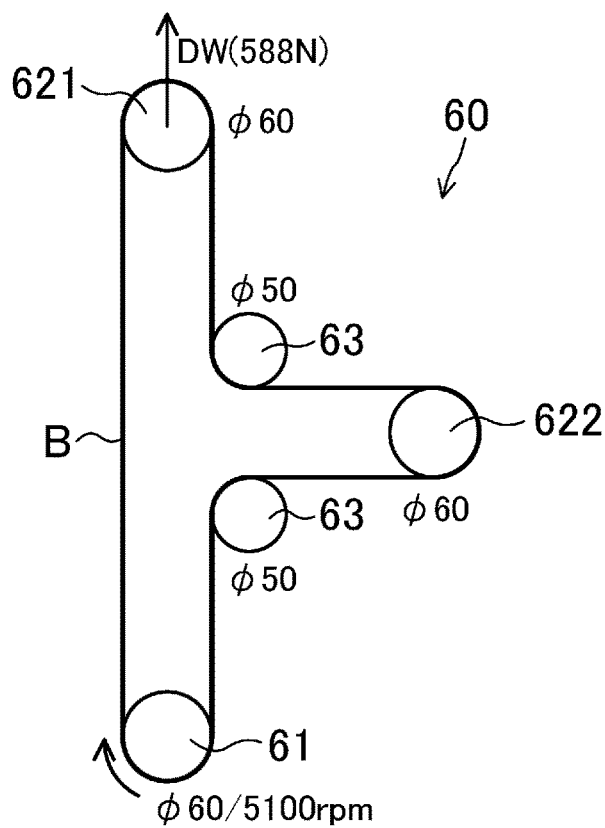
FIG. 20A illustrates a layout of pulleys of a belt running test machine for a flex-fatigue-resistance evaluation test.

FIG. 20A illustrates a layout of pulleys of a belt running test machine 60 for a flex-fatigue-resistance evaluation test.

This belt running test machine 60 includes: a driver pulley 61 having a pulley diameter of φ60 mm; a first driven pulley 621 provided above the driver pulley 61, and having a pulley diameter of φ60 mm; a second driven pulley 622 provided in the midway between, and to the right of, the driver pulley 61 and the first driven pulley 621, and having a pulley diameter of φ60 mm; and pulleys 63 provided in a pair and each having a pulley diameter of φ50 mm. The idler pulleys 63 are vertically spaced apart from each other and arranged in the midway between, and to the right of, the driver pulley 61 and the first driven pulley 621. The driver pulley 61 and the first and second driven pulleys 621 and 622 are rib pulleys. The idler pulleys 63 are flat-belt pulleys. The first driven pulley 61 is vertically movable so that a load of dead weight DW can be applied to the looped V-ribbed belt B. Note that the belt running test machine 60 flexes the V-ribbed belt B to the back surface, which increases strain caused at a top of the flexed V-shaped rib, and accelerates flex fatigue.

The V-ribbed belt B was looped over the belt running test machine 60 such that an inner circumference of the V-ribbed belt B touched the driver pulley 61, and the first and second driven pulleys 621 and 622, and an outer circumference of the V-ribbed belt B touched the idler pulleys 63. Furthermore, a load was applied upward to the first driven pulley 621 to provide a dead weight DW of 588N to the V-ribbed belt B. Then, at an ambient temperature of 70° C., the driver pulley 61 was driven at a rotation speed of 5,100 rpm to run the V-ribbed belt B. The running V-ribbed belt B was periodically stopped and presence or absence of a crack on the compressed rubber layer was visually checked. The test ended when the presence of the crack was confirmed, and the running time period until the end of the test was determined as a crack causing time period. The V-ribbed belt B was to run up to 500 hours.

<Evaluation Test of Abnormal Noise from Running Belt>

Figure 20B:
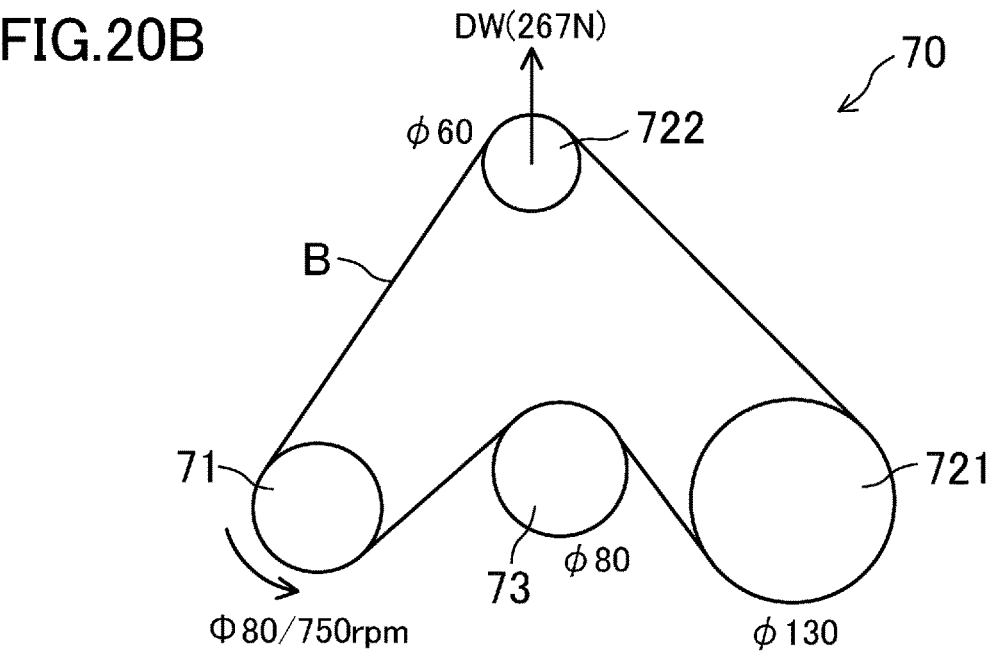
FIG. 20B illustrates a layout of pulleys of a belt running test machine for an evaluation test of abnormal noise from a running belt.

FIG. 20B illustrates a layout of pulleys of a belt running test machine 70 for an evaluation test of abnormal noise from a running belt.

This belt running test machine 70 includes: a driver pulley 71 having a pulley diameter of φ80 mm; a first driven pulley 721 provided to the right of the driver pulley 71, and having a pulley diameter of φ130 mm; a second driven pulley 722 provided in the midway between, and provided above, the pulleys 71 and 721, and having a pulley diameter of φ60 mm; and an idler pulley 73 provided in the midway between the driver pulley 71 and the first driven pulley 721, and having a pulley diameter of φ80 mm. The driver pulley 71 and the first and second driven pulleys 721 and 722 are rib pulleys. The idler pulley 73 is a flat-belt pulley. The second driven pulley 722 is vertically movable so that a load of dead weight DW can be applied to the looped V-ribbed belt B.

The V-ribbed belt B was looped over the belt running test machine 70 such that an inner circumference of the V-ribbed belt B touched the driver pulley 71, and the first and second driven pulleys 721 and 722, and an outer circumference of the V-ribbed belt B touched the idler pulleys 73. Furthermore, the first driven pulley 721 and the driver pulley 71 were misaligned to each other at 1.5°, and a load was applied upward to the second driven pulley 722 to provide a dead weight DW of 267N to the V-ribbed belt B. Then, at an ambient temperature of a room temperature, the driver pulley 71 was driven at a rotation speed of 750 rpm to run the V-ribbed belt B. The second driven pulley 722 was fed with water ten times using a spray gun. When the water was fed, presence or absence of abnormal noise was sensorily evaluated.

(Results of Tests and Evaluations)

Table 3 shows the results of the tests.

Note that the adhesive rubber layer and the extension rubber layer were made of an EPDM rubber composition, the reinforcing fabric was made of a woven fabric including 6,6-nylon fibers and having a thickness of 1.0 mm, and the cord was made of a twisted yarn including para-aramid fibers and having an outer diameter of 0.7 mm. Each of the double-cogged V-belts had a belt length of 820 mm, a belt width to a belt outer circumference of 28.6 mm, a belt thickness of 14.5 mm, a cross-sectional V-angle of 30°, a pitch for a lower cog of 9.5 mm, a height for a lower cog of 7.3 mm, a pitch for an upper cog of 8.0 mm, a height for an upper cog of 3.3 mm, a thickness between a cord center and a groove bottom between lower cogs of 2.0 mm, and a thickness between the cord center and a groove bottom between upper cogs of 1.9 mm.

(Methods for Tests and Evaluations)

Figure 21:
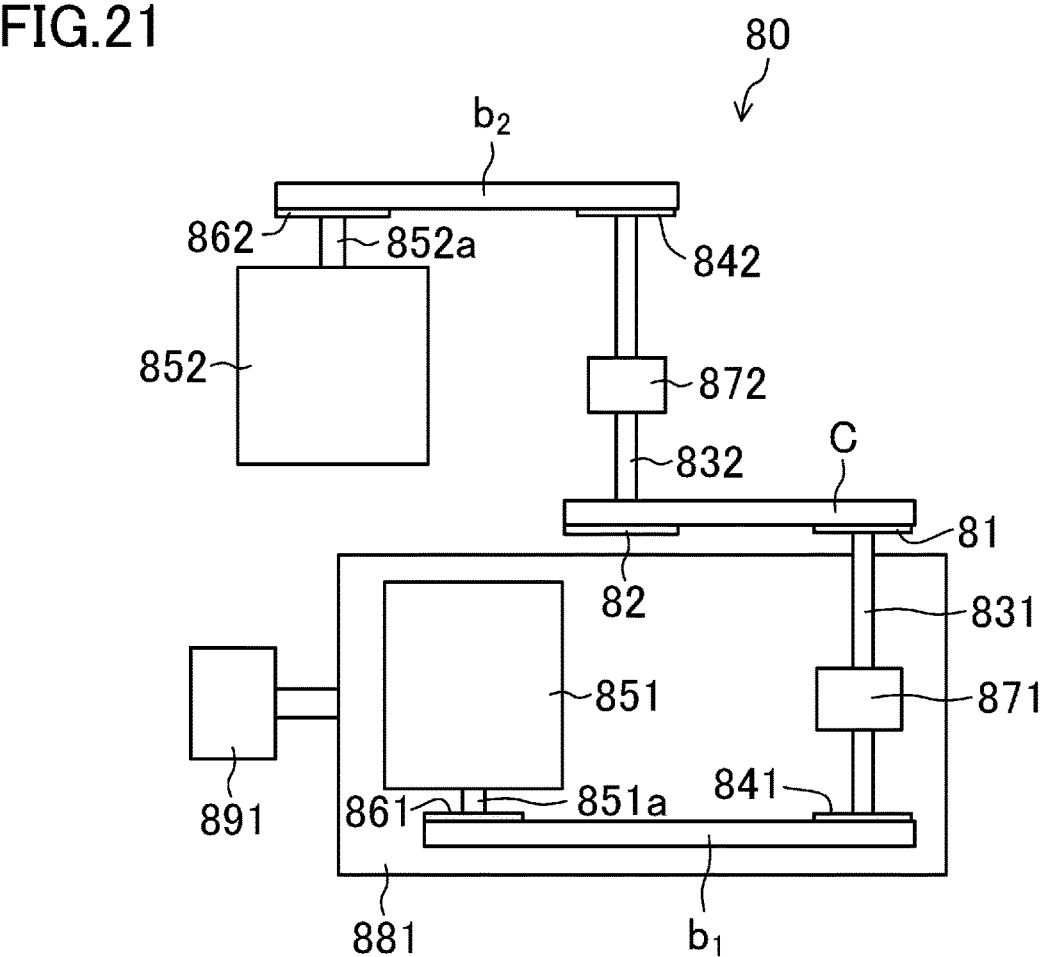
FIG. 21 is a plan view of a belt running test machine for a double-cogged V-belt.

FIG. 21 illustrates a belt running test machine 80 for the double-cogged V-ribbed belt C.

This belt running test machine 80 includes a driver pulley 81 and a driven pulley 82. Having V-shaped grooves, the driver pulley 81 and the driven pulley 82 are horizontally arranged in a single plane. The driver pulley 81 is attached to an end of a drive shaft 831. A pulley 841 is attached to another end of the drive shaft 831. A belt $b_1$ is looped over the pulley 841 and a pulley 861 attached to a motor shaft 851a of a drive motor 851. Then, power of the drive motor

TABLE 3

|  | Example | | | | Comparative Example | | | |
| --- | --- | --- | --- | --- | --- | --- | --- | --- |
|  | 1 | 2 | 3 | 4 | 1 | 2 | 3 | 4 |
| Flex Fatigue Resistance Crack Causing Time Period (Time Period) | Over 500 | Over 500 | Over 500 | Over 500 | 150 | 130 | Over 500 | Over 500 |
| Abnormal Noise from Running Belt | No Abnormal Noise | No Abnormal Noise | No Abnormal Noise | No Abnormal Noise | No Abnormal Noise | No Abnormal Noise | Large Abnormal Noise | Large Abnormal Noise |

Comparative Examples 1 and 2 showed their respective crack occurring time periods of 150 hours and 130 hours; meanwhile, no crack was observed in Examples 1 to 4 and Comparative Examples 3 and 4 in the running time period of 500 hours.

Abnormal noise was heard in Comparative Examples 3 and 4, but not in other Examples 1 to 4 and Comparative Examples 1 and 2.

These results show the findings below. The V-ribbed belts using a compressed rubber layer including both the nanofibers and the organic short fibers as seen in Examples 1 to 4 are higher in flex fatigue resistance than the V-ribbed belts using a compressed rubber layer including the organic short fibers alone without nanofibers as seen in Comparative Examples 1 and 2. Moreover, the former belts are higher in noise reduction performance than the V-ribbed belts using a compressed rubber layer including the nanofibers alone without the organic short fibers as seen in Comparative Examples 3 and 4.

[Test and Evaluation 3]

(Double-Cogged V-Belt)

Using each of the rubber compositions in Example 5 and Comparative Example 5, double-cogged V-belts including a compressed rubber layer were produced with a technique similar to the second embodiment, such that the grain direction of the rubber compositions was oriented along the belt width.

81 is transmitted to the drive shaft 831 via the belt $b_1$ to rotate the driver pulley 81. Furthermore, the drive shaft 831 is provided with a torque meter 871. The driven pulley 82 is attached to an end of a driven shaft 832. A pulley 842 is attached to another end of the driven shaft 832. A belt $b_2$ is looped over the pulley 842, and a pulley 862 attached to a shaft 852a of a load generator 852. Then, the load from the load generator 852 is transmitted to the driven shaft 832 via the belt $b_2$. Furthermore, the driven shaft 832 is provided with a torque meter 872. A drive system, such as the drive motor 851, is placed on a movable bed 881. Motion of the movable bed 881 may apply a predetermined load to the double-cogged V-belt C acting as a specimen, and the applied load is detected by a load cell 891.

<Transmission Performance and Transmission Efficiency Evaluation Test>

Figure 22A:
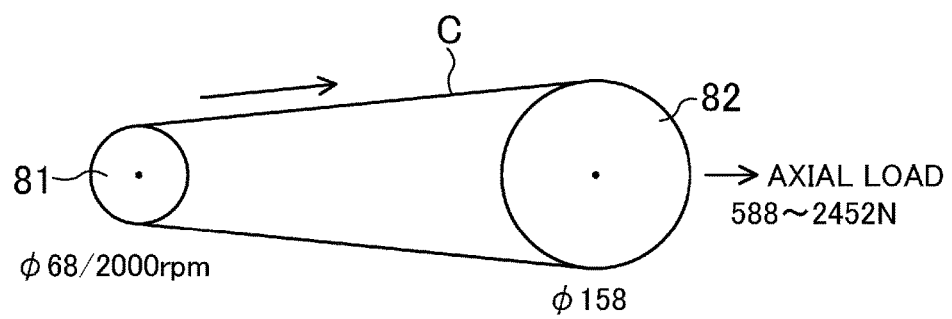
FIG. 22A illustrates a layout of pulleys for a transmission performance and transmission efficiency evaluation test.

FIG. 22A illustrates a layout of pulleys for a transmission performance and transmission efficiency evaluation test.

The driver pulley 81 and the driven pulley 82, used in the transmission performance and transmission efficiency evaluation test, had respective pulley diameters of 68 mm and 158 mm. Then, the double-cogged V-belt C was looped over the driver pulley 81 and the driven pulley 82, and an axial load was applied to the driven pulley 82. Concurrently, the driver pulley 81 was rotated at a speed of 2,000 rpm to run the double-cogged V-belt C.

Here, the axial load varied in a range from 588 N to 2452 N. For each axial load, rotation speeds of the driver pulley 81 and the driven pulley 82 were measured, and an apparent slip rate (including a slip rate obtained when, due to deformation of the belt, the belt (i) came off from, and dropped into, a pulley, and (ii) stretched), observed when torque transmitted toward the driven pulley varied, was temporally obtained. Then, based on the torque transmitted toward the driven pulley, a theoretical driver pulley diameter (i.e., the pulley diameter at which the pulley width is the same as the belt width, on the assumption that the belt width at the cord center (a belt pitch width) does not change), and the layout, an ST value at a slip rate of 4% was obtained by the following expression:

$$ST \text{ value} = \frac{Tq/r}{\text{Effective Tension}} \Big/ \frac{r\theta}{\text{Length of Wrap}} = Tq/r^2\theta \quad \text{Math. 1}$$

$Tq$ = Torque Transmitted toward Driven Pulley (N·m)

$r$ = Pulley Radius (m)

$\theta$ = Angle of Wrap (rad)

Moreover, an ST value at a slip rate of 4% for each axial load (hereinafter referred to as "a 4% ST value") was obtained. Based on a relationship between the axial load and the 4% ST value, a maximal of the 4% ST value was designated as an index of the transmission performance (i.e., power that the double-cogged V-belt C may transmit per unit length of wrap).

Furthermore, based on the expression below, a transmission efficiency was obtained for each of the cases where (i) an input torque into the driver pulley was 5N·m and an axial load was 196N, and (ii) an input torque into the driver pulley was 20N·m and an axial load was 784N.

$$\text{Transmission Efficiency} = \frac{n2 \times (Tq2 + \text{Loss Torque})}{n1 \times Tq1} \times 100 \quad \text{Math. 2}$$

$n1$: Driver Pulley Rotation Speed $n2$: Driven Pulley Rotation Speed $Tq1$: Input Torque into Driver Pulley $Tq2$: Torque Transmitted toward Driven Pulley Loss Torque: Loss Torque when Belt is rotated at No Load (torque 0)

<High-Speed Durability Evaluation Test>

Figure 22B:
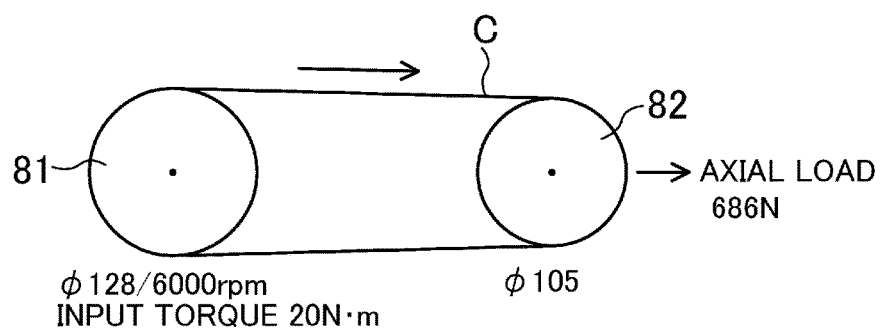
FIG. 22B illustrates a layout of pulleys for a high-speed durability evaluation test.

FIG. 22B illustrates a layout of pulleys for a high-speed durability evaluation test.

The driver pulley 81 and the driven pulley 82, used in the high-speed durability evaluation test, had respective pulley diameters of 128 mm and 105 mm. The double-cogged V-belt C was looped over these driver pulley 81 and driven pulley 82, and an axial load of 686N was applied to a side of the driven pulley 82. Then, at an ambient temperature of 120° C., the driver pulley 81 was driven at a speed of 6,000 rpm to run the double-cogged V-belt C where an input torque was 20N·m. The running double-cogged V-belt C was periodically stopped and presence or absence of a crack on the compressed rubber layer was visually checked. The test ended when the presence of the crack was confirmed, and the running time period until the end of the test was determined as a high-speed durability time period. The double-cogged V-belt C was to run up to 1,000 hours.

(Results of Tests and Evaluations)

Table 4 shows the results of the tests.

TABLE 4

| | | Example 5 | Comparative Example 5 |
|---|---|---|---|
| Transmission Performance, Maximal ST Value (N/m) | | 8200 | 8100 |
| Transmission Efficiency (%) | Input Torque into Driver Pulley: 5N · m, Axial Load: 196N | 75 | 70 |
| | Input Torque into Driver Pulley: 20N · m, Axial Load: 784 N | 89 | 88 |
| High-Speed Durability, High-Speed Durability (Time Period) | | Over 1000 | 650 |

In Example 5, the transmission performance (the maximal of the 4% ST value) was 8,200 N/m. In Comparative Example 5, the transmission performance was 8,100 N/m.

The transmission efficiency was 75% in Example 5 and 70% in Comparative Example 5 where the input torque was 5N·m and the axial load was 196N. The transmission efficiency was 89% in Example 5 and 88% in Comparative Example 5 where the input torque was 20N·m and the axial load was 784N.

In the high-speed durability, no crack was observed in Example 5 in the running time period of 1,000 hours. In Comparative Example 5, however, a crack was observed in 650 hours on a groove bottom between lower cogs.

These results show that there is no difference in transmission performance between the double-cogged V-belt having the compressed rubber layer including both the nanofibers and the para-amid short fibers as seen Example 5 and the double-cogged V-belt having the compressed rubber layer including the para-amid short fibers alone without nanofibers as seen in Comparative Example 5. However, the double-cogged V-belt having the compressed rubber layer of Example 5 is higher in transmission efficiency especially at a low torque than the double-cogged V-belt using the compressed rubber layer of Comparative Example 5. The results further show that the double-cogged V-belt having the compressed rubber layer of Example 5 is significantly higher in high-speed durability than the double-cogged V-belt having the compressed rubber layer of Comparative Example 5.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present invention is useful for a V-belt and a method for producing the V-belt.

The invention claimed is:

1. A V-belt comprising
a rubber composition forming a portion to be V-shaped side faces of the V-belt, wherein
the rubber composition includes nanofibers and organic short fibers oriented along a belt width of the V-belt, the nanofibers including polyethylene terephthalate (PET) fibers having a fiber diameter ranging from 300 nm to 900 nm, and the organic short fibers having a fiber diameter of 10 μm or larger, and
in the rubber composition, a ratio of a storage modulus in a grain direction along the belt width to a storage modulus in a cross-grain direction along a belt length of the V-belt is 5 or greater, the storage modulus in the grain direction being measured based on JIS K6394 with the rubber composition stretched at a mean strain which is a strain under a load 1.3 times greater than a load at a strain of 1%, a strain amplitude of 0.1%, a frequency of 10 Hz, and a test temperature of 100° C., and the storage modulus in the cross-grain direction being measured based on JIS K6394 with the rubber composition stretched at the mean strain of 5%, the strain amplitude of 1%, the frequency of 10 Hz, and the test temperature of 100° C.

2. The V-belt of claim 1, wherein
in the rubber composition, the ratio of the storage modulus in the grain direction along the belt width to the storage modulus in the cross-grain direction along the belt length is 10 or smaller, the storage modulus in the grain direction being measured based on JIS K6394 with the rubber composition stretched at the mean strain that is the strain under the load 1.3 times greater than the load at the strain of 1%, the strain amplitude of 0.1%, the frequency of 10 Hz, and the test temperature of 100° C., and the storage modulus in the cross-grain direction being measured based on JIS K6394 with the rubber composition stretched at the mean strain of 5%, the strain amplitude of 1%, the frequency of 10 Hz, and the test temperature of 100° C.

3. The V-belt of claim 1, wherein
in the rubber composition, a total sum of a content mass of the nanofibers and a content mass of the organic short fibers ranges from 1.0 part by mass to 25.0 parts by mass for 100 parts by mass of the rubber component.

4. The V-belt of claim 1, wherein
in the rubber composition, the content mass of the nanofibers is smaller than or equal to the content mass of the organic short fibers.

5. The V-belt of claim 1, wherein
in the rubber composition, a total sum of a volume fraction of the nanofibers and a volume fraction of the organic short fibers ranges from 5% by volume to 8% by volume.

6. The V-belt of claim 1, wherein
in the rubber composition, the volume fraction of the nanofibers is smaller than or equal to the volume fraction of the organic short fibers.

7. The V-belt of claim 1, wherein
the nanofibers have a fiber length ranging from 0.3 mm to 5 mm, and a ratio of the fiber length to a fiber diameter ranging from 500 to 10,000.

8. The V-belt of claim 1, wherein the organic short fibers have a fiber length ranging from 1.5 mm to 10 mm, and a ratio of the fiber length to a fiber diameter ranging from 100 to 500.

9. The V-belt of claim 1, wherein
the nanofibers and the organic short fibers are different in kind.

10. The V-belt of claim 9, wherein
the organic short fibers include 6,6-nylon short fibers or para-aramid short fibers.

11. The V-belt of claim 1, wherein
the organic short fibers include PET short fibers.

12. A method for producing the V-belt of claim 1, the method comprising:
preparing a kneaded body, the preparing including kneading a rubber component with a composite material having a matrix-domain structure, including (i) a matrix having thermoplastic resin and (ii) domains formed of a bundle of nanofibers including polyethylene terephthalate (PET) fibers having a fiber diameter ranging from 300 nm to 900 nm, at a temperature higher than or equal to a melting point or a softening temperature of the thermoplastic resin in the composite material so that the kneaded body is prepared, the kneaded body being made of an uncrosslinked rubber composition including the rubber component in which the nanofibers and organic short fibers are dispersed, and the organic short fibers having a fiber diameter of 10 μm or greater;
rolling the kneaded body, of the uncrosslinked rubber composition, prepared in the preparing to produce an uncrosslinked rubber composition sheet to be used for forming the portion to be the V-shaped side faces; and
forming a belt product out of the uncrosslinked rubber composition sheet produced in the rolling such that a grain direction of the uncrosslinked rubber composition sheet is oriented along a width of the V-belt, and crosslinking the formed belt.

13. The method for producing the V-belt of claim 12, wherein
the composite material is made of conjugated fibers cut into rods, the conjugated fibers having the matrix including the nanofibers separately arranged in parallel with one another as the domains.

14. The method for producing the V-belt of claim 12, wherein
the rubber component includes ethylene-α-olefin elastomer, and the thermoplastic resin in the composite material includes polyethylene resin.

* * * * *

UNITED STATES PATENT AND TRADEMARK OFFICE
CERTIFICATE OF CORRECTION

PATENT NO. : 9,909,647 B2
APPLICATION NO. : 15/083053
DATED : March 6, 2018
INVENTOR(S) : Keizo Nonaka Page 1 of 1

It is certified that error appears in the above-identified patent and that said Letters Patent is hereby corrected as shown below:

In Column 12 at Lines 9-10, Change "300 μm to 1,000 μm," to --300 nm to 1,000 nm,--.

In Column 19 at Line 57, Change "μm" to --nm--.

In Column 22 at Line 60, Change "μm." to --nm.--.

In Column 23 at Line 24, Change "μm." to --nm.--.

Signed and Sealed this
Tenth Day of July, 2018

Andrei Iancu
*Director of the United States Patent and Trademark Office*